United States Patent [19]

Krakirian

[11] Patent Number: 5,450,546
[45] Date of Patent: Sep. 12, 1995

[54] INTELLIGENT HARDWARE FOR AUTOMATICALLY CONTROLLING BUFFER MEMORY STORAGE SPACE IN A DISK DRIVE

[75] Inventor: Chahe H. Krakirian, Milpitas, Calif.
[73] Assignee: Adaptec, Inc., Milpitas, Calif.
[21] Appl. No.: 830,041
[22] Filed: Jan. 31, 1992
[51] Int. Cl.6 ............................................. G06F 3/00
[52] U.S. Cl. ......................... 395/250; 395/821; 364/239.6; 364/239.7; 364/238.3; 364/DIG. 1
[58] Field of Search ............................ 395/250, 275

[56] References Cited

U.S. PATENT DOCUMENTS

| | | | |
|---|---|---|---|
| 4,040,026 | 8/1977 | Gernelle | 364/900 |
| 4,542,457 | 9/1985 | Mortensen et al. | 395/275 |
| 4,571,672 | 2/1986 | Burns et al. | 395/250 |
| 4,603,382 | 7/1986 | Cole et al. | 395/250 |
| 4,716,522 | 12/1987 | Funabashi et al. | 364/200 |
| 4,933,840 | 6/1990 | Sera et al. | 395/275 |
| 5,056,010 | 10/1991 | Huang | 395/425 |
| 5,084,841 | 1/1992 | Williams et al. | 365/189.07 |
| 5,224,213 | 6/1993 | Dieffenderfer et al. | 395/250 |
| 5,249,271 | 9/1993 | Hopkinson et al. | 395/250 |
| 5,267,191 | 11/1993 | Simpson | 365/78 |
| 5,278,956 | 1/1994 | Thomsen et al. | 395/250 |
| 5,295,246 | 3/1994 | Bischoff et al. | 398/200 |

Primary Examiner—Christopher B. Shin
Attorney, Agent, or Firm—Skjerven, Morrill, MacPherson, Franklin & Friel; Forrest E. Gunnison

[57] ABSTRACT

An integrated disk controller integrated circuit in a disk drive includes the buffer room logic hardware of this invention within a buffer control circuit. The buffer room logic hardware monitors the status of a buffer memory as data are written into and read from the buffer memory in data transfers between a disk and another device, typically a computer. When the buffer memory is either full or empty, the buffer room logic hardware automatically generates signals that control subsequent data transfer to or from the buffer memory. Therefore, the buffer room logic hardware prevents buffer overruns and buffer underruns without intervention or other action by a microprocessor. When the buffer memory is empty, data transfer is either terminated or suspended until data become available in the buffer memory. When the buffer memory is full, the buffer room logic hardware either generates a signal that terminates the data transfer or generates a signal that suspends further data transfer until space becomes available in the buffer memory. In one embodiment, the buffer room logic hardware does not permit resumption of data transfer until a predetermined threshold value of space is available in the buffer memory.

17 Claims, 29 Drawing Sheets

KEY TO

KEY TO

| FIG. 6A-1 |
| --- |
| FIG. 6A-2 |

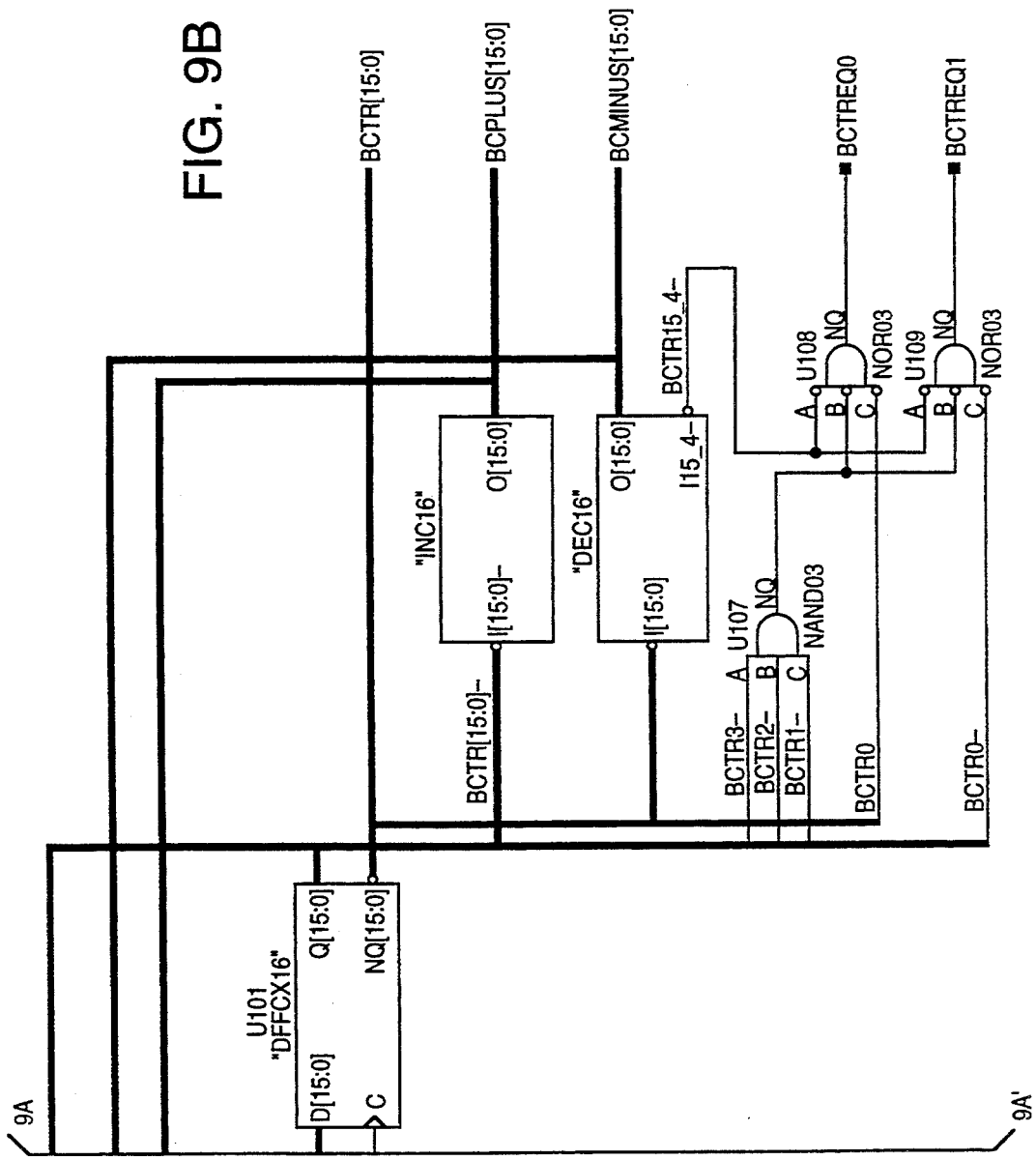

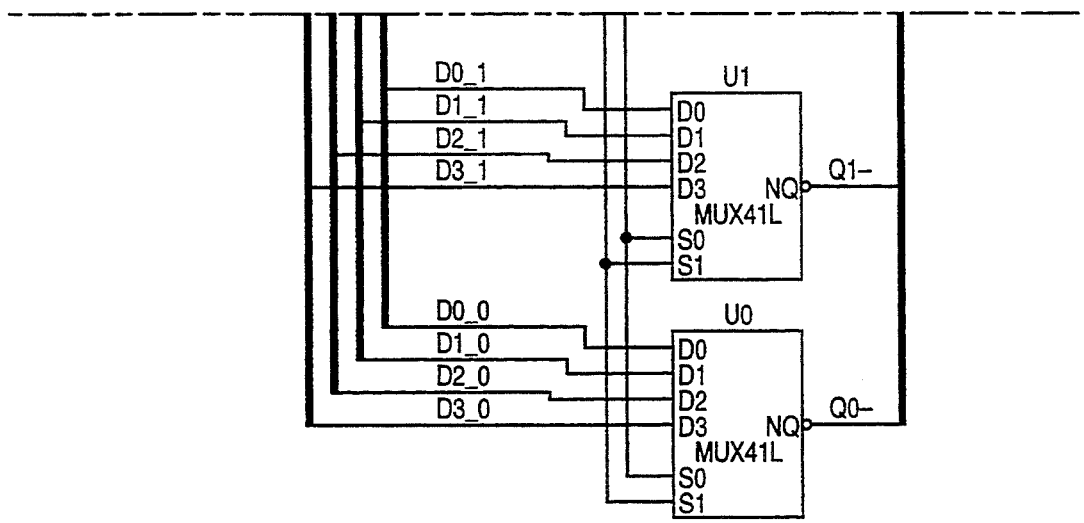
FIG. 10A-2
KEY TO
FIG. 10A
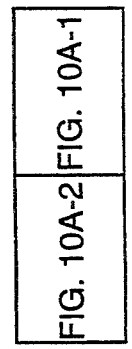

KEY TO

INTELLIGENT HARDWARE FOR AUTOMATICALLY CONTROLLING BUFFER MEMORY STORAGE SPACE IN A DISK DRIVE

BACKGROUND OF THE INVENTION

1. Field of the Invention

The present invention relates generally to transferring data between a hard disk drive and a host data bus and more particularly to automated hardware for controlling space in a disk drive buffer memory used in the data transfer.

2. Description of Related Art

Personal computers, sometimes referred to as microcomputers, have gained wide spread use in recent years primarily because they are inexpensive and yet powerful enough to handle computationally-intensive user applications. The data storage and data sharing capabilities of personal computers typically include one or more hard disk drives.

A hard disk drive 115 (FIG. 1) has a rotating magnetic medium 190, i.e., a disk, that is magnetized in a certain pattern by a read/write head 191 which flies above the surface of disk 190. During a write operation, head 191 creates patterns on the magnetic coating of rotating disk 190 which represent data, while in a read operation, head 191 reads the patterns created during the write operation.

In most high capacity hard disk drives, several disks are mounted above one another on a common spindle. Each of the disks has at least one read/write head per disk surface. Data are written in concentric circular tracks on the disk surface.

Data stored on a hard disk are generally divided into files. Each file represents a unit of data which is processed by computer 105. The files are stored on rotating disk 190 in sectors. The number of sectors which are written in one revolution of the disk comprises a track. Therefore, to specify the location of any particular piece of data on the disk surface a head address, a track address, and a sector number are required. The head, track, and sector addresses are sometimes referred to as the geometric address.

The operations performed in response to a request from a computer program executing in computer 105 to read data from or to write data to disk drive 115 are well known to those skilled in the art. Typically, during this operation, an electronic circuit in disk drive 115 receives a request for a particular sector of data on one of the disks in drive 115, e.g., the electronic circuit is provided the geometric address for the sector.

The electronics in disk drive 115 include a microprocessor 110, typically a first generation microprocessor such as microprocessors Model No. 8080/8085 sold by Intel Corporation of Sunnyvale, Calif., a storage controller integrated circuit 100 that interfaces microprocessor 110, drive electronics 185, host interface bus 175, and random access buffer memory 120. Drive electronics 185 (i) convert the analog signals from read/write head 191 to digital signals for storage controller integrated circuit 100, and (ii) control the mechanical operation of disk drive 115.

Host intrface bus 175 is, for example, an ISA, EISA, microchannel or SCSI bus. The structure and operation of computers with any one of these bus structures are well known to those skilled in the art.

Storage controller integrated circuit 100 includes a microprocessor interface circuit 160, a disk controller circuit 130, buffer controller 140, and host interface circuit 170. The structure and operation of storage controller integrated circuit 100 are also well-known to those skilled in the art. For example, Cirrus Logic of Fremont, Calif. offers such an integrated circuit as Model No. SH260. Chips and Technology of San Jose, Calif. offers such an integrated circuit as Model No. 82C5059. Adaptec Corporation of Milpitas, Calif. offers Model No. AIC-9110.

The operations performed by microprocessor 110 are typically determined by program instructions, i.e., firmware, that are loaded in microprocessor 110 from a non-volatile memory when disk drive 115 is turned on. When the computer provides a read/write request to circuit 100 over the host interface bus, one of a geometric address, i.e., track, head and sector, and a logic block address, for example, is provided asynchronously to host interface circuit 170. This information is stored directly in registers in circuit 170.

Upon receipt of the read/write request and the geometric address, microprocessor 110 performs the necessary operations to initialize host interface circuit 170, disk controller circuit 130 and buffer controller circuit 140 for the requested read or write operation. The initialization signals are passed from microprocessor 110 through microprocessor interface circuit 160 to the other circuits over microprocessor control bus 166. For clarity, the control signals lines between microprocessor 110 and microprocessor interface circuit 160 as well as the control signal lines between disk controller circuit 130, buffer controller circuit 140, host interface circuit 170 and RAM 120 are not shown in FIG. 1.

After initialization for a read operation, data are passed from drive electronics 185 to disk controller circuit 130 which in turn sends the data to buffer controller circuit 140. Buffer controller circuit 140 stores the data in buffer memory 120. When one or more complete sectors of data are stored in buffer memory 120, microprocessor 110 initiates a transfer of the data from buffer memory 120 to a first-in-first-out (FIFO) memory in host interface circuit 170. When the FIFO memory is nearly full, circuit 170 transfers the data over bus 175 to host computer 105.

After initialization for a write operation, data are passed from bus 175 to host interface circuit 170 which in turn sends the data to buffer controller circuit 140. Buffer controller circuit 140 stores the data in buffer memory 120. Microprocessor 110 subsequently initiates a transfer of the data from buffer memory 120 to disk controller circuit 130 which in turn transfers the data to disk drive electronics 185.

Disk and host data transfers normally occur concurrently. Buffer controller circuit 140 multiplexes access to buffer memory 120 between disk and host data transfers on a byte-per-byte basis. Hence, buffer controller circuit 140 maintains two address pointers, a read address pointer and a write address pointer, for buffer memory 120, as well as a stop pointer.

The two address pointers access all of buffer memory 120 or the segment of buffer memory allocated for the operation in a circular fashion, i.e., whenever the pointer reaches the top address of the buffer memory or the segment of buffer memory, the pointer wraps back to the bottom address of the buffer memory or segment. If after wrapping the pointer continued to increment past the starting address for the data transfer, data would be overwritten. Consequently, the stop pointer is maintained to indicate that the buffer memory or buffer memory segment is full.

Typically, the write address pointer is an up counter that holds the address of the next byte to be written to buffer memory 120. The read address pointer is an up counter that holds the next address of the next byte to be read from buffer memory 120. During a write operation, the write address pointer is used for transfer of data from host interface circuit 170 to buffer memory 120 and the read address pointer is used for transfer of the data from buffer memory 120 to disk controller circuit 130. During a read operation, the use of the pointers is reversed.

The starting and stopping addresses for a data transfer to or from buffer memory 120 is controlled solely by microprocessor 110. For example, in a read from disk 190, microprocessor 110 sets the write address pointer and the read address point to the location in buffer memory for the transfer, i.e., microprocessor 110 initializes the appropriate counters. Microprocessor 110 also initializes the stop pointer to the value of the read address pointer minus one. As each byte of data is written to buffer memory 120, the write address pointer is incremented. Similarly as each byte is read from buffer memory, the read address pointer is incremented.

Microprocessor 110 receives a signal from disk controller circuit 130 to indicate the transfer of a block, i.e., a sector, of data to buffer memory 120. Similarly, microprocessor 110 receives a signal to indicate the transfer of a block from buffer memory 120 to host interface circuit 170. Microprocessor 110 periodically updates the stop pointer based on the number of blocks that have been read from buffer memory 120 since after the data are read, the storage location is available for new data.

Data are written to buffer memory 120 until the value of the write pointer address equals the stop pointer which indicates that if another byte is written to buffer memory 120, valid data will be over written. Thus, microprocessor 110 must continuously monitor the three pointers during the data transfer and periodically update the stop pointer. This requires considerable microprocessor firmware overhead. Unfortunately, as the disk drive capacity increases and the average seek time decreases, both microprocessor clock cycles and demands for firmware increase. Therefore, buffer pointer management by microprocessor 110 limits the capability that can be supported because it requires considerable firmware as well as clock cycles to perform the operations necessary to monitor the status of buffer memory 120.

SUMMARY OF THE INVENTION

In accordance with the principles of this invention, a buffer room logic circuit includes a counter as well as means for incrementing and means for decrementing the counter. The counter is used to monitor the room and data available in a buffer memory, i.e., the status of the buffer memory, as data are transferred to and from the buffer memory, without intervention by a microprocessor. The counter detects when a buffer overrun, i.e., data being transferred to the buffer memory when no space is available, is about to occur and generates a signal that suspends further data transfer to the buffer memory. The counter also detects when a buffer underrun, i.e., data being transferred from the buffer memory when no data are available, is about to occur and generates a signal that suspends further data transfer from the buffer memory.

The prevention of buffer underruns and overruns without microprocessor intervention is important because the prior art system of pointers controlled by the microprocessor required considerable microprocessor time as well as firmware to support the microprocessor operations. The buffer room logic circuit of this invention eliminates the system of pointers and thereby frees the microprocessor for other operations in place of monitoring the status of the buffer memory. In addition, elimination of the firmware required to support the microprocessor monitoring of the buffer status provides additional space for firmware for other operations. Therefore, the buffer room logic circuit of this invention significantly enhances the operations that may be performed by the microprocessor without affecting the ability to prevent buffer overruns and underruns.

In one embodiment, the buffer room logic circuit of this invention includes a first counter for counting each data segment, typically a byte of data, transferred to the buffer memory. When the first counter has counted a selected number of data segments, typically a block of data, the first counter generates a signal that changes the value of a second counter in a first direction.

Preferably, the second counter is initialized to a predetermined value, for example, the minimum value or maximum value, and the first direction is towards the value opposite to the initialized value. Thus, if the second counter is initialized to the maximum value, the first direction is towards the minimum value. As each subsequent selected number of data segments are transferred to the buffer memory, the first counter generates the signal that changes the value of the second counter in the first direction.

When the second counter reaches the value opposite the initialized value, e.g., the minimum value if the second counter was initialized to the maximum value, the buffer memory is full and further data transfers to the buffer memory are suspended without intervention by the microprocessor.

However, data may also be transferred from the buffer memory, and in this embodiment, the buffer room logic circuit of this invention includes yet a third counter for counting each data segment, typically a byte of data, transferred from the buffer memory. When the third counter has counted a selected number of data segments, typically a block of data, the third counter generates a signal that changes the value of the second counter in a second direction opposite to the first direction.

Consequently, the first and third counters change the value of the second counter in the first and second directions respectively, as data are transferred to and from the buffer memory. If in this sequence, the second counter returns to the initialized value, the buffer memory is empty and the buffer room logic circuit generates a signal that stops data transfer from the buffer memory thereby preventing a data underrun without microprocessor intervention.

In another embodiment, the value of the second counter is changed by a signal indicating that the selected number of data segments have been transferred to the buffer memory. In this embodiment, the second counter is initialized to a first value that is opposite to the initial value in the above embodiment. The first counter changes the value of the second counter as each selected number of data segments are transferred from the buffer memory.

Hence, if the second counter reaches a value opposite to the initialized value, the buffer memory is full and the buffer room logic circuit generates a signal that stops further transfer of data to the buffer memory. Conversely, if the second counter reaches the initialized value, the buffer memory is empty and again the buffer room logic circuit generates a signal that stops further transfer of data from the buffer memory.

Thus, the buffer room logic circuit of this invention monitors the room available in the buffer memory as well as the data available in the buffer memory. The buffer room logic circuit, after initialization, requires no monitoring by the microprocessor and therefore improves the performance of the disk drive.

BRIEF DESCRIPTION OF THE DRAWINGS

FIGS. 9A and 9B are a more detailed schematic diagram of block counter BLOCKCNT of FIG. 4B.

DETAILED DESCRIPTION

Figure 1:
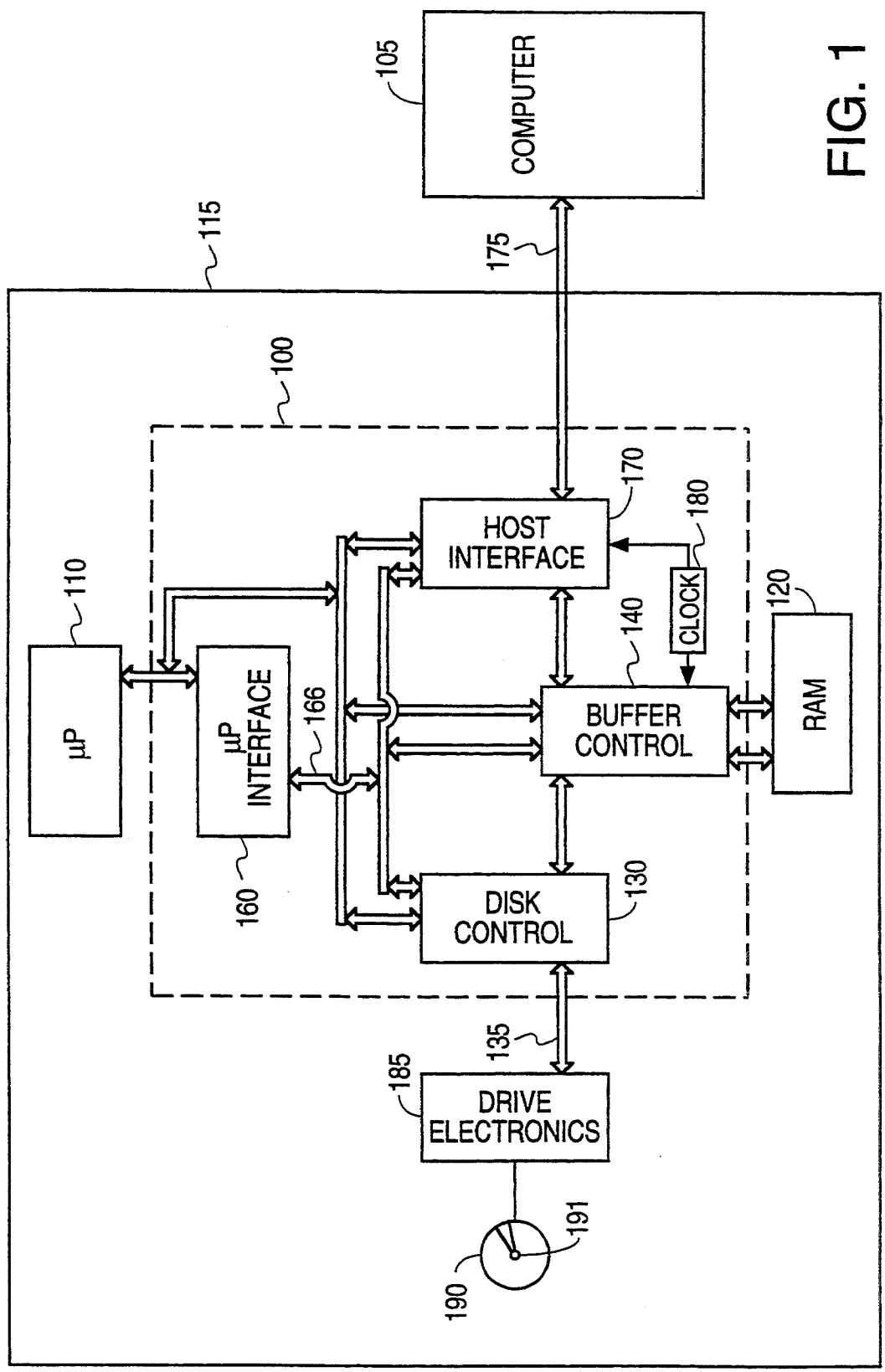
FIG. 1 is a block diagram of a computer system that includes a disk drive with a prior art integrated circuit disk drive controller.

In accordance with the principles of this invention, an integrated disk controller integrated circuit 200 in a disk drive includes novel buffer room logic hardware 250 within buffer control circuit 240. Buffer room logic hardware 250 monitors the status of buffer memory 220 as data are written into and read from buffer memory 220 in data transfers between a disk and another device, typically a computer. When buffer memory 220 is either full or empty, buffer room logic hardware 250 automatically generates signals that control subsequent data transfer to or from buffer memory 220. Therefore, buffer room logic hardware 250 prevents buffer overruns and buffer underruns without intervention or other action by a microprocessor.

When buffer memory 220 is empty, data transfer is either terminated or suspended until data become available in buffer memory 220. When buffer memory 220 is full, buffer room logic hardware 250 either generates a signal that terminates the data transfer or generates a signal that suspends further data transfer until space becomes available in buffer memory 220. In one embodiment, buffer room logic hardware 250 does not permit resumption of data transfer until a predetermined threshold value of space is available in buffer memory 220.

Since buffer room logic hardware 250 performs all operations necessary to prevent buffer overruns and buffer underruns, microprocessor 210 is available for other operations. In addition, the firmware required for monitoring the status of buffer memory 220 is no longer needed. Consequently, not only is microprocessor 210 available for other operations, but also additional space in the non-volatile memory containing the firmware is available for firmware to support other operations. Therefore, disk drives containing buffer room logic hardware 250 have greater capability and versatility than prior art disk drives that used firmware and the microprocessor to monitor the status of buffer memory 220. As used herein "status of buffer memory" means the amount of space utilized in the buffer memory and whether data remain in the buffer memory.

In one embodiment, integrated disk controller integrated circuit 200 (integrated disk controller) includes disk control circuit 230, host interface circuit 270, and microprocessor interface circuit 260 in addition to buffer control circuit 240 that includes buffer room logic hardware 250 of this invention. The operation and configuration of disk control circuit 230, host interface circuit 270, microprocessor interface circuit 260, and buffer control circuit 240 are equivalent to prior art circuits with the exceptions noted below that are utilized to implement buffer room logic hardware 250.

In one embodiment, host interface circuit 270 couples integrated disk controller integrated circuit 200 to a SCSI bus 275. However, in view of this disclosure, those skilled in the art can use buffer room logic hardware 250 with a with variety of busses. Consequently, this description is illustrative only of the principles of the invention and is not intended to limit the invention to the particular embodiment described herein.

As in the prior art, in a write operation to the disk, data are first written to buffer memory 220 and then read from buffer memory 220 and written to disk. Conversely, in a read operation from the disk, data are first written to buffer memory 220 from the disk and then read from buffer memory 220 and written to SCSI bus 275. Data are transferred between buffer memory 220 and the disk and between buffer memory 220 and SCSI bus 275 in blocks. Typically, a block, i.e., a sector, is 512 bytes of data.

Buffer room logic hardware 250 is initialized by microprocessor 210 through microprocessor interface circuit 260 upon power-up of the disk drive containing integrated disk controller 200. Specifically, microprocessor 210 loads control registers 258 with the number of bytes in a block of data and the maximum number of blocks in buffer memory 220. Herein, buffer memory 220 is considered as a single complete entity. However, as is known to those skilled in the art, buffer memory 220 may contain one or more segments. Buffer room logic hardware 250 is used with one segment of buffer memory 220 in this case. The operation of buffer room logic hardware for either a segment of memory or the complete memory is the same with only the maximum number of blocks being changed. Consequently, the maximum number of blocks in buffer memory 220 is programmable by microprocessor 210.

In each data transfer between the disk and bus 275, microprocessor 210 initializes buffer room logic hardware 250 by setting bits in control registers 258 to clear disk byte counter 252 and host byte counter 254, i.e., initialize counters 252 and 254 to a first value, and to enable disk byte counter 252 and host byte counter 254, as required. Microprocessor 210 sets other bits in control registers 258 to load block counter 256 with a predetermined value and to enable incrementing and decrementing of block counter 256. In one embodiment, block counter 256 is a sixteen bit up/down programmable counter. In this embodiment, disk byte counter 252 is a twelve bit decrementing programmable counter as is host byte counter 254.

In a write operation from SCSI bus 275 to the disk, i.e., integrated disk controller 200 is in a Write Mode, the predetermined value loaded in block counter 256 by microprocessor 210 is the maximum number of blocks in buffer memory 220 minus one block. At start of the transfer of each byte from SCSI bus 275 to SCSI first-in-first-out memory circuit (SCSI FIFO) 271, hereinafter SCSI FIFO 271, in host interface circuit 270, a pulse is generated on line HBCDEC to host byte counter 254. The pulse on line HBCDEC is generated by host interface circuit 270 every time SCSI request signal REQ is asserted by integrated disk controller 200.

The first pulse to host byte counter 254 on line HBCDEC causes host byte counter to roll over from the initial zero value to a value equal to the number of bytes in a block minus one byte, i.e., a predetermined value is loaded in counter 254. As each subsequent byte is loaded from SCSI bus 275 into SCSI FIFO 271, the pulse on line HBCDEC decrements host byte counter 254. Thus, when host byte counter 254 reaches a specified value, i.e., zero, a block of data has been transferred to buffer memory 220.

When host byte counter 254 reaches zero, block counter 256 is decremented to indicate that one block less of memory is available in buffer memory 220. Upon the start of the transfer of the next block of data from SCSI bus 275 to SCSI FIFO 271, the pulse on line HBCDEC again causes host byte counter 254 to roll over to the value equal to the number of bytes in a block minus one byte. When the second complete block is in buffer memory 220, block counter 256 is again decremented.

As in the prior art devices, transfers between buffer memory 220 and the disk, and between buffer memory and SCSI bus 275 take place concurrently. Thus, buffer control circuit 240, in response to signals from microprocessor 210, may start to transfer data that has been loaded in buffer memory 220 to the disk. As each byte is transferred from buffer memory 220 to disk, a pulse is generated on a line DFACK from within buffer control circuit 240 to disk byte counter 252.

The first pulse to disk byte counter 252 on line DFACK causes disk byte counter 252 to roll over from the initial zero value to a value equal to the number of bytes in a block minus one byte, i.e., a predetermined value is loaded in the counter. As each subsequent byte is transferred from buffer memory 220 to the disk, the pulse on line DFACK decrements disk byte counter 252. Thus, when disk byte counter 252 reaches a specified value, i.e., zero, a block of data has been transferred from buffer memory 220 to disk.

When disk byte counter 252 reaches zero, block counter 256 is incremented to indicate that one block more of memory is available in buffer memory 220. Upon the start of the transfer of the next block of data from buffer memory 220 to the disk, the pulse on line DFACK again causes disk byte counter 252 to roll over to the value equal to the number of bytes in a block minus one byte. When the second complete block is transferred from buffer memory 220, block counter 256 is again incremented.

Hence, in the write operation, disk byte counter 252 and host byte counter 254 increment and decrement respectively, block counter 256. Consequently, microprocessor 210 is not required to maintain and monitor pointers for buffer memory 220 as in the prior art systems.

The writing of data from SCSI bus 275 to disk continues until block counter 256 reaches either a zero value or the maximum value, i.e., either a first limiting value or a second limiting value. If block counter 256 reaches zero, buffer memory 220 is full and buffer room logic hardware 250, as described more completely below, stops the data transfer from SCSI bus 275 to buffer memory 220 so that a buffer overrun does not occur. When block counter 256 reaches the maximum value, buffer memory 220 is empty, and the transfer of data from buffer memory 220 to the disk is terminated.

In the writing of data to disk, when host byte counter 250 has a value of one and decrements to zero, the signal on line SREQSTOP to host interface circuit 270 goes high to disable the generation of the next SCSI request signal REQ. Signal SREQSTOP remains high until the signal on line OFFCNTZERO from host interface circuit 270 goes high. The signal on line OFFCNTZERO goes high when the SCSI acknowledge signal ACK is received for the last byte of data in the block. When the signal on line OFFCNTZERO goes high, block counter 256 is decremented by one and the signal on line SREQSTOP goes low if the value of block counter 256 is not zero. If the value of block counter 256 is zero, signal SREQSTOP remains high so that data is not requested when the buffer memory has no available storage space. Thus, bytes of data are requested from the host only when space is available in buffer memory 220, and block counter 256 is decremented only after transfer of a complete block.

In a read operation from the disk to SCSI bus 275, i.e., integrated disk controller 200 is in a Read Mode, a zero value is loaded in block counter 256 by microprocessor 210. Bits in control register 258 are set to enable incrementing and decrementing of block counter 256, to enable host byte counter 254, and to clear host byte counter 254.

When a block of data has been read from disk and written to buffer memory 220 without an error or a block with an error was automatically corrected in buffer memory 220, disk control circuit 230 generates a pulse on line SECTOR_OK that increments block counter 256. As each subsequent block is transferred from disk to buffer memory 220 a pulse on line SECTOR_OK increments block counter 256.

Again, transfers between buffer memory 220 and the disk and buffer memory 220 and SCSI bus 275 take place concurrently. Thus, buffer control circuit 240 may start to transfer the data that has been loaded in buffer memory 220 to SCSI bus 275. At the start of the transfer of each byte from buffer memory 220 to SCSI FIFO 271 in host interface circuit 270, a pulse is generated on line BACK to alert SCSI FIFO that a byte of data is coming.

The pulse on line BACK is used to decrement host byte counter 254. The first pulse to host byte counter 254 on line BACK causes host byte counter 254 to roll over from the zero value to a value equal to the number of bytes in a block minus one byte, i.e., again the predetermined value is loaded in counter 254. As each subsequent byte is transferred from buffer memory 220 to SCSI FIFO 271, the pulse on line BACK decrements host byte counter 254. Thus, when host byte counter 254 reaches the selected value, e.g., zero, a block of data has been transferred from buffer memory 220.

When host byte counter 254 reaches zero, block counter 256 is decremented to indicate that one block more of memory is available in buffer memory 220. Upon the start of the transfer of the next block of data from buffer memory 220 to SCSI FIFO 271, the pulse on line BACK again causes host byte counter 254 to roll over to the value equal to the number of bytes in a block minus one byte. When the second complete block is transferred from buffer memory 220, block counter 256 is again decremented.

Hence, in the read operation, signal SECTOR_OK and host byte counter 254 increment and decrement respectively, block counter 256. Consequently, microprocessor 210 is also not required to maintain and monitor pointers for buffer memory 220 as in the prior art systems for a read operation.

The reading of data from disk to SCSI bus 275 continues until block counter 256 reaches either zero or the maximum value. If block counter 256 reaches the maximum value, buffer memory 220 is full and buffer room logic hardware 250, as described more completely below, stops the data transfer from the disk to buffer memory 220 so that a buffer overrun does not occur. When block counter 256 reaches a zero value, buffer memory 220 is empty, and the transfer of data from buffer memory 220 to SCSI bus 275 is terminated.

Figure 2:
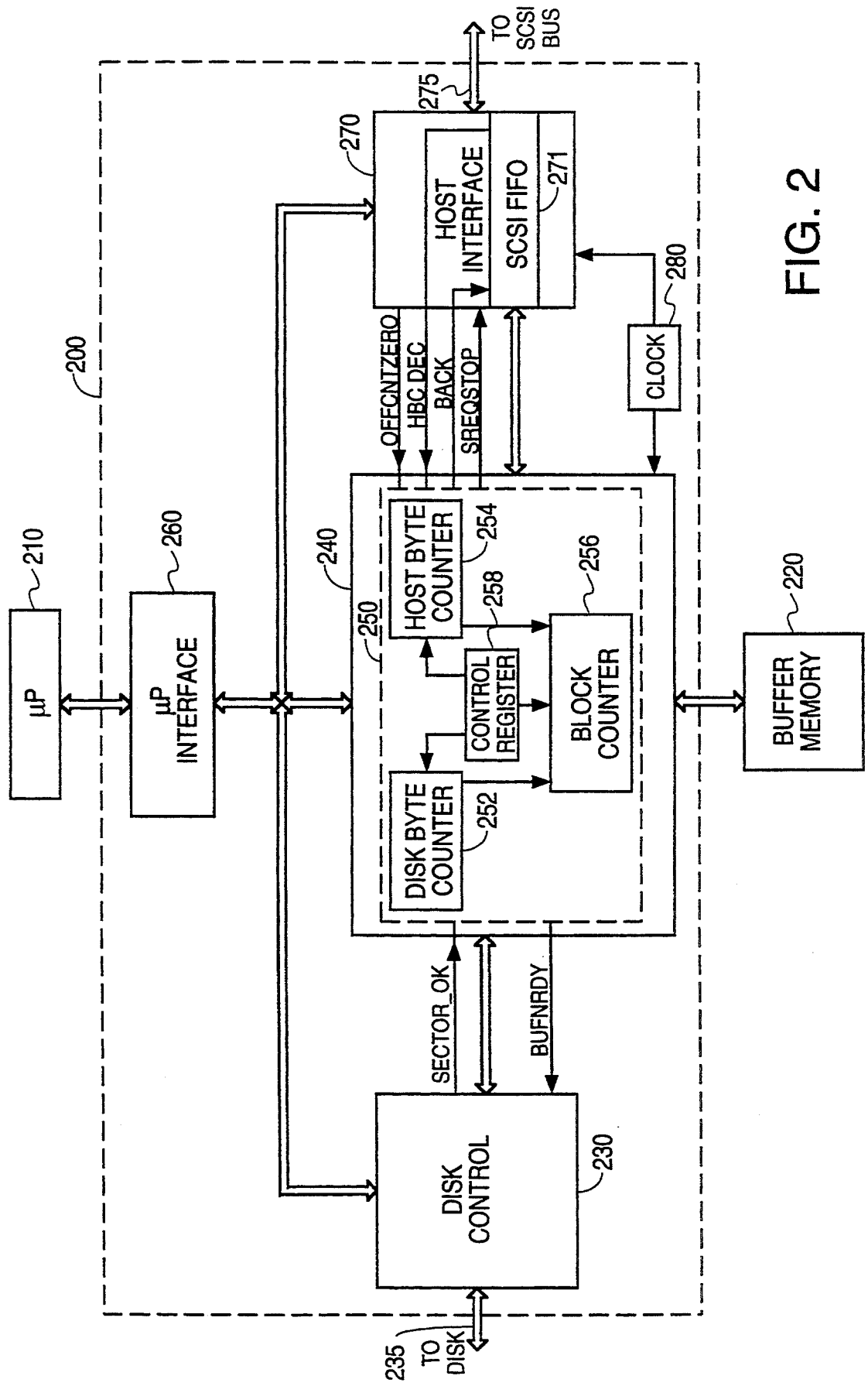
FIG. 2 is a block diagram of an integrated circuit disk drive controller that includes the novel buffer room logic circuit of this invention.

FIGS. 3A through 13 are a more detailed schematic diagram of buffer room logic hardware 250 (FIG. 2) of this invention. In FIGS. 3A through 13, the reference numeral for a component refers to only the component shown in the particular figure. Further, a common reference name is used for both a line and the signal on the line. Control registers 258 (FIG. 2) are not illustrated in FIGS. 3A through 13. Rather, signal lines from bits in the registers have the same name as the bits. Therefore, the addition of the registers to the detailed schematic diagrams will be apparent to those skilled in the art.

One embodiment of control registers 258 is given in Table 1. In Table 1, a "(—)" after the number of a bit indicates that preferably the bit is cleared upon power-up of integrated disk controller 200. The use and initialization of the various bits in control registers 258 are described more completely below.

TABLE 1

Block counter Control Register
(BCTRCTL, Write/Read, 59h)

| Bit | Definition |
|---|---|
| 7(-) | DBCAREN - Disk Byte Carry Enable |
| 6(-) | HBCCLR - Host Byte Counter Clear |
| 5(-) | DBCCLR - Disk Byte Counter Clear |
| 4(-) | BCTRLOAD - Block Counter Load |
| 3:2(-) | BCTRVAL[1:0] - Block Counter Load Value |
| 1(-) | BCTRHOSTEN - Block Counting Enabled With Host Transfers |
| 0(-) | BCTRDISKEN - Block Counting Enabled With Disk Transfers |

Maximum Block Count Register, Byte 0
(BKMAX_0, Write, 5Ah)

| Bit | Definition |
|---|---|
| 7:0 | BKMAX[7:0] |

Maximum Block Count Register, Byte 1
(BKMAX_1, Write, 5Bh)

| Bit | Definition |
|---|---|
| 7:0 | BKMAX[15:8] | where:
BKMAX <= (SEGSIZE div (BCMAX+1)) − 1

Block Count Threshold Register, Byte 0
(BCTHR_0, Write, 5Ch)

| Bit | Definition |
|---|---|
| 7:0 | BCTHR[7:0] |

Block Count Threshold Register, Byte 1
(BCTHR_1, Write, 5Dh)

| Bit | Definition |
|---|---|
| 7:0 | BCTHR[15:8] |

Maximum Byte Count Register, Byte 0
(BCMAX_0, Write, 5Eh)

| Bit | Definition |
|---|---|
| 7:0 | BCMAX[7:0] |

Maximum Byte Count Register, Byte 1
(BCMAX_1, Write, 5Fh)

| Bit | Definition |
|---|---|
| 7:4 | reserved |
| 3:0 | BCMAX[11:8] |

Block Counter Register, Byte 0
(BCTR_0, Read, 5Ah)

| Bit | Definition |
|---|---|
| 7:0(-) | BCTR[7:0] |

Block Counter Register, Byte 1
(BCTR_1, Read, 5Bh)

| Bit | Definition |
|---|---|
| 7:0(-) | BCTR[15:8] |

Host Byte Counter Register, Byte 0
(HBC_0, Read, 5Ch)

| Bit | Definition |
|---|---|
| 7:0(-) | HBC[7:0] |

Host Byte Counter Register, Byte 1
(HBC_1, Read, 5Dh)

| Bit | Definition |
|---|---|
| 7:4 | reserved |
| 3:0(-) | HBC[11:8] |

Disk Byte Counter Register, Byte 0
(DBC_0, Read, 5Eh)

| Bit | Definition |
|---|---|
| 7:0(-) | DBC[7:0] |

Disk Byte Counter Register, Byte 1
(DBC_1, Read, 5Fh)

| Bit | Definition |
|---|---|
| 7:4 | reserved |
| 3:0(-) | DBC[11:8] |

In this embodiment, in a write from the host to the disk, microprocessor 210 (FIG. 2) initializes the various bits in register BCTRCTL (Table 1). Specifically, bit DBCAREN is set so that block counter 256 (FIG. 2) is incremented every time disk byte counter 252 decrements from a value of one to a value of zero. Bit DBCAREN is preferably modified only when the disk port is disabled. Bit BCTRDISKEN is set to enable incrementing block counter 256 during host transfers when data are moved from buffer memory 220 to disk.

Host byte counter clear bit HBCCLR and disk byte counter clear bit DBCCLR are both set. The high signal on line HBCCLR is applied to terminal BCCLR of host byte counter HBCNT (FIG. 3B) to clear the counter, and the high signal on line DBCCLR is applied to terminal BCCLR of disk byte counter DBCNT (FIG. 3A) to clear the counter.

Figure 5A:
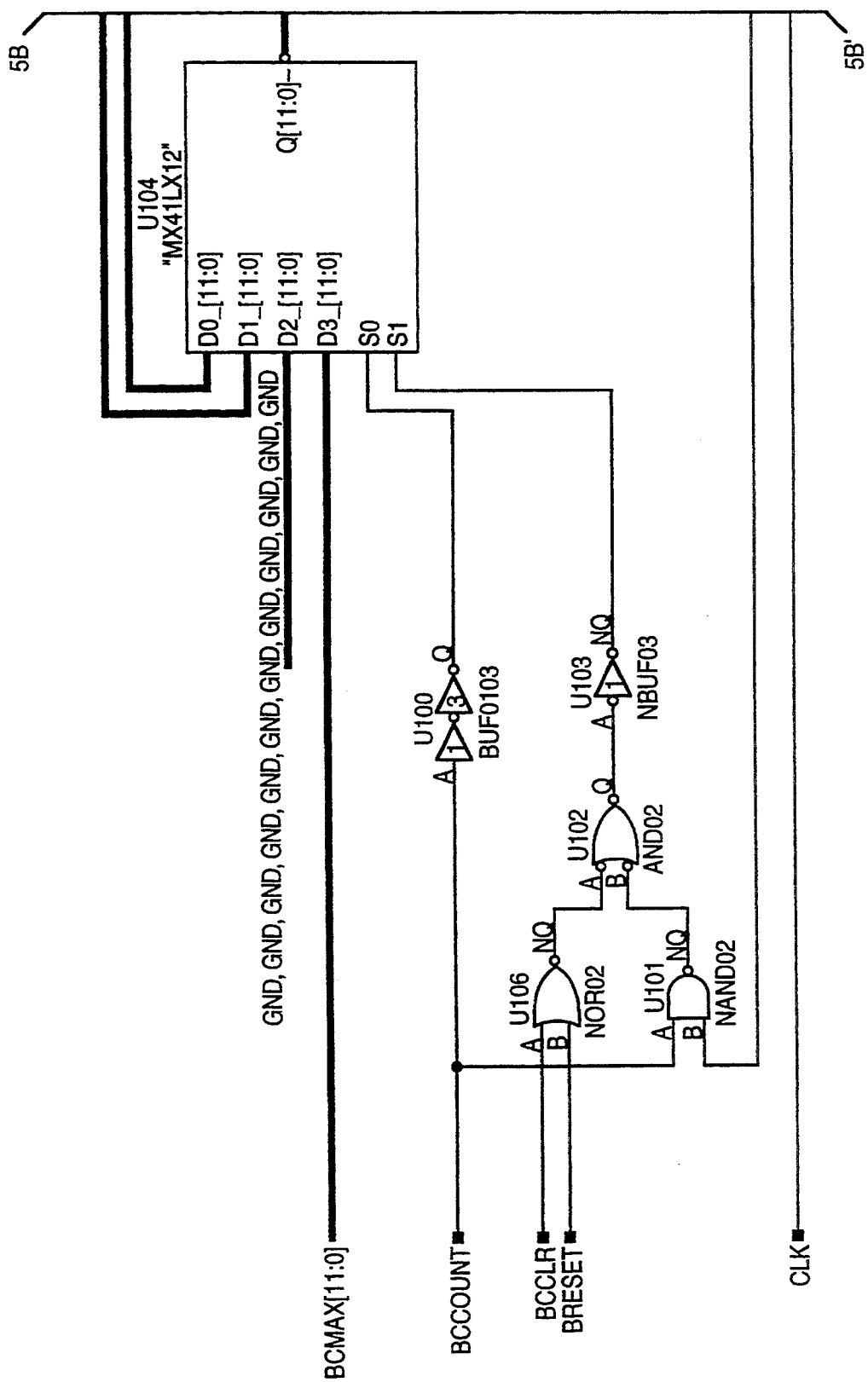
FIGS. 5A and 5B are a more detailed schematic diagram of host byte counter HBCNT of FIG. 3B and of disk byte counter DBCNT of FIG. 3A.
Figure 5B:
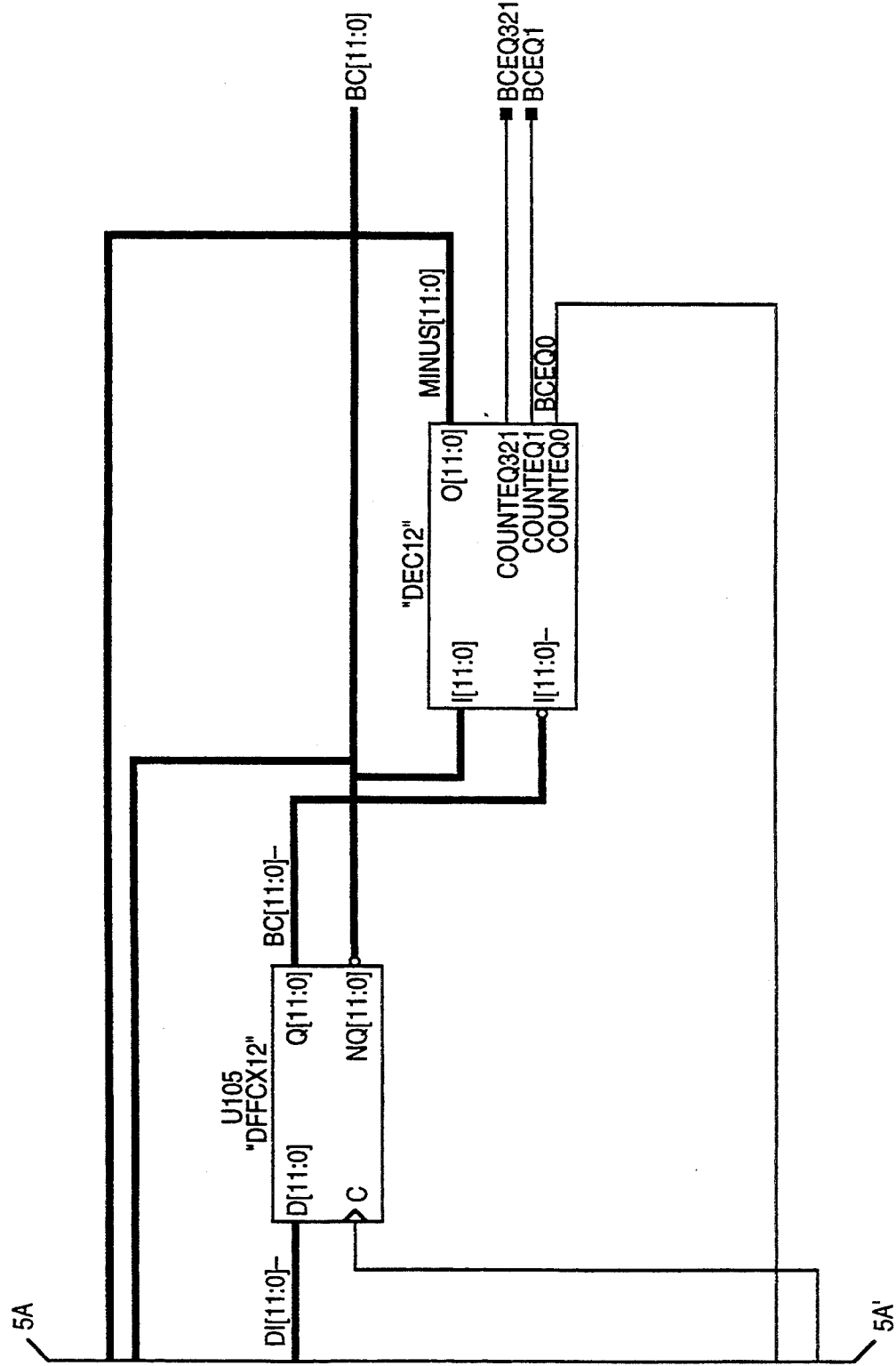

FIGS. 5A and 5B are a more detailed schematic diagram of disk byte counter DBCNT and host byte counter HBCNT, which in this embodiment are identical. Briefly, both counters include a twelve bit 4:1 multiplexer U104 (FIG. 5A) which has four input terminals, two signal select input terminals, and an output terminal which provides the inverse of the signal on the selected input terminal. Note, as described more completely below, each of the four input terminals and the output terminal represents a group of terminals that are connected to a bus. The output signal from multiplexer U104 is applied to the D input terminal of twelve bit D-type flip-flop U105 (FIG. 5B). Output terminal Q of flip-flop U105 drives input terminal I— of decrement logic circuit DEC12. Output terminal NQ of flip-flop U105 drives bus BC and input terminal I of decrement logic circuit DEC12. Herein and in the overview descriptions that follow, a terminal reference character, "Q" for example, is the same as, and a shorthand notation for the reference character giving the number of lines in the bus connected to the terminal, "Q(11:0)" for example.

Figures 1, 6A:
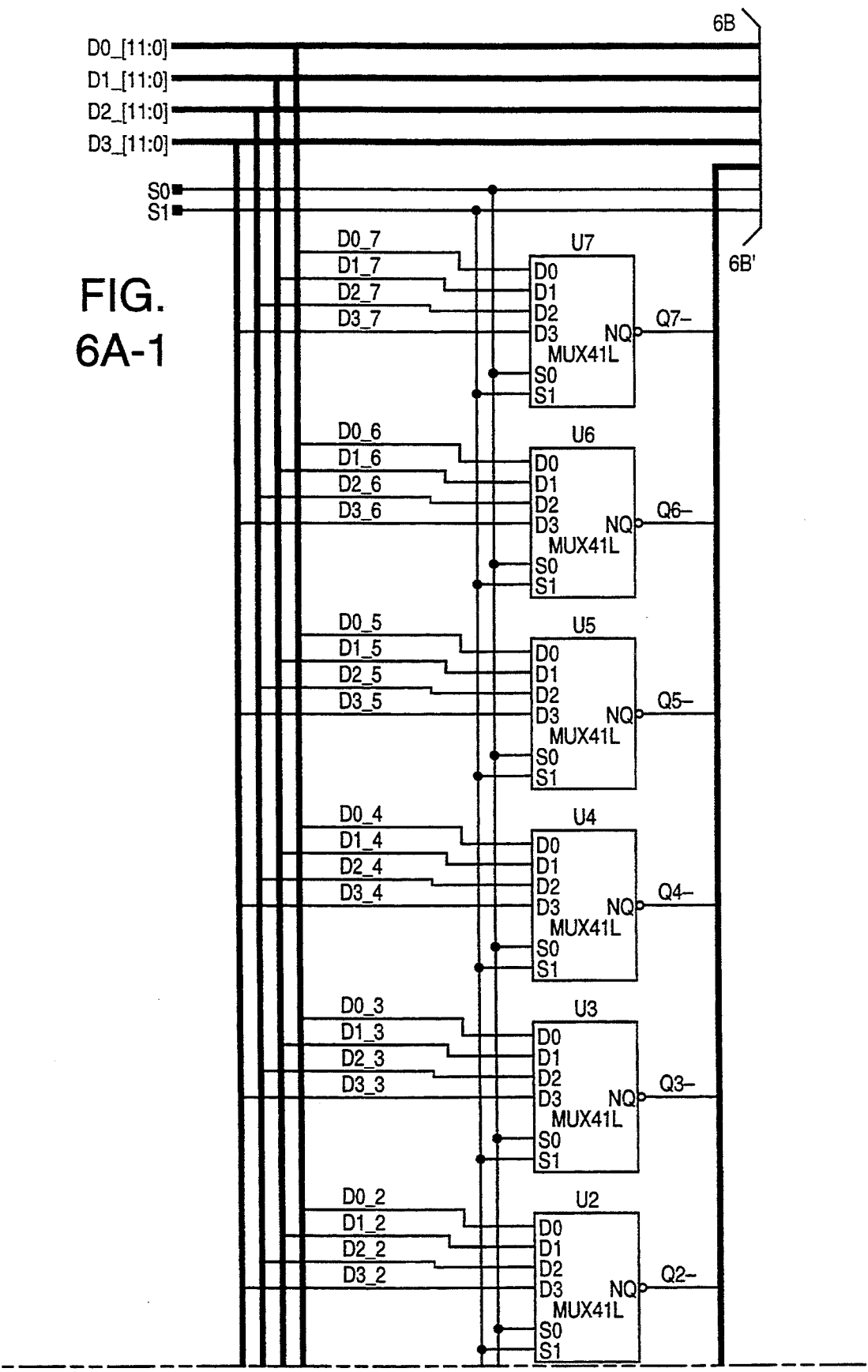
FIGS. 6A and 6B are a more detailed schematic diagram of twelve bit 4:1 multiplexer U104 of FIG. 5A, where FIG. 6A includes FIGS. 6A-1 and 6A-2 as shown in the Key to FIG. 6A on FIG. 6A-2.
Figures 2, 6A:
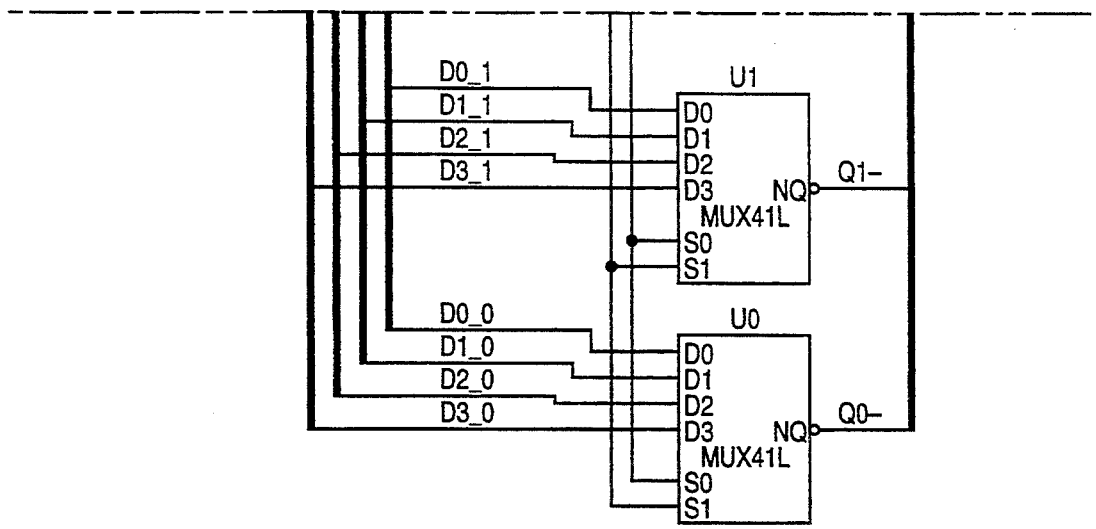
Figure 6B:
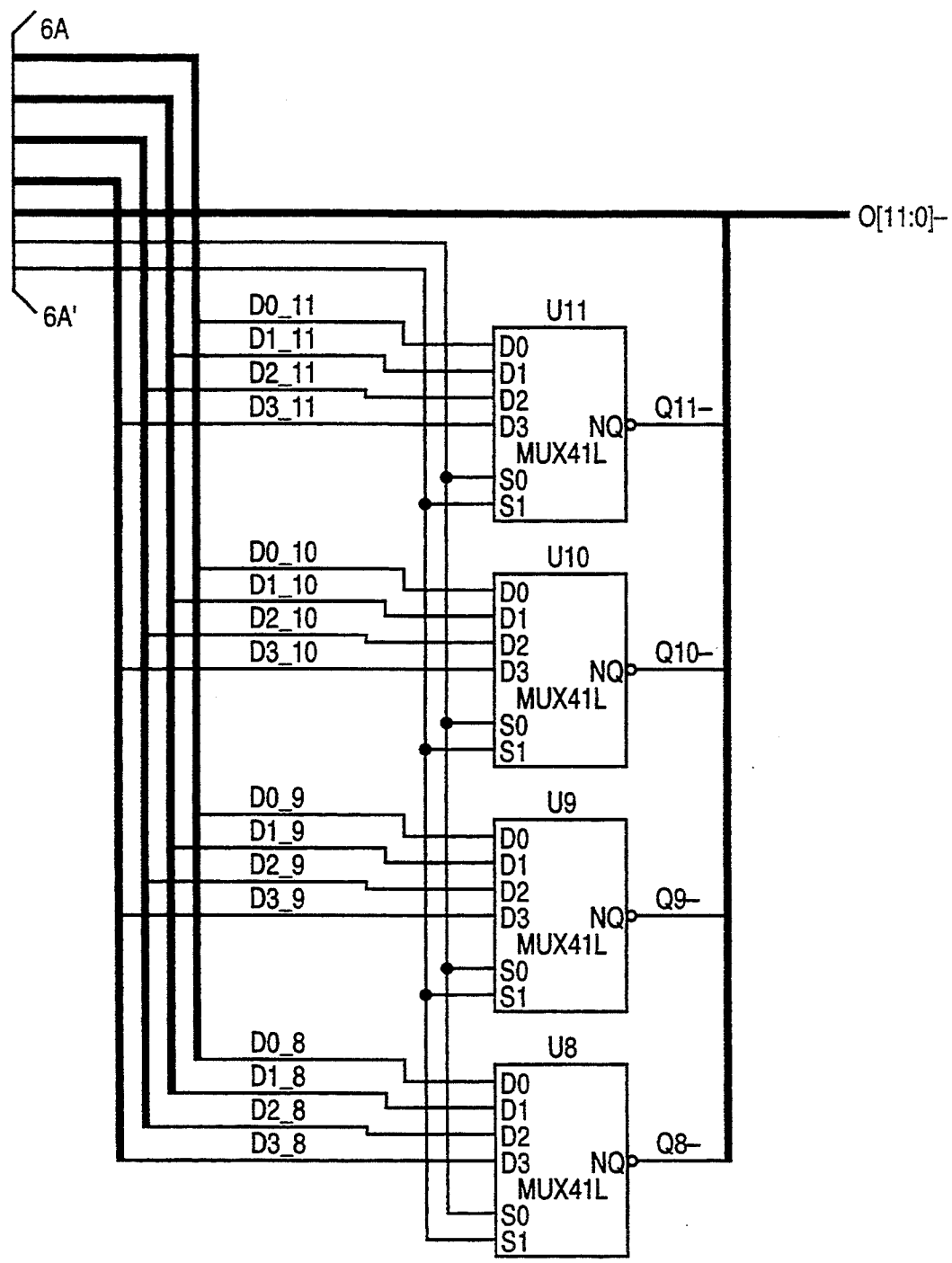

At this time in the initialization, the signal on line BCCOUNT (FIG. 5A) is low and so a low signal is applied to terminal S0 of twelve bit 4:1 multiplexer U104 (FIG. 5A), which is illustrated in more detail in FIGS. 6A and 6B. The high signal on line BCCLR drives the output signal of NOR gate U106 low which in turn drives the output signal of AND gate U102 low and consequently the output signal of inverter U103 high so that a high signal is applied to terminal S1 of twelve bit 4:1 multiplexer U104.

Figure 7:
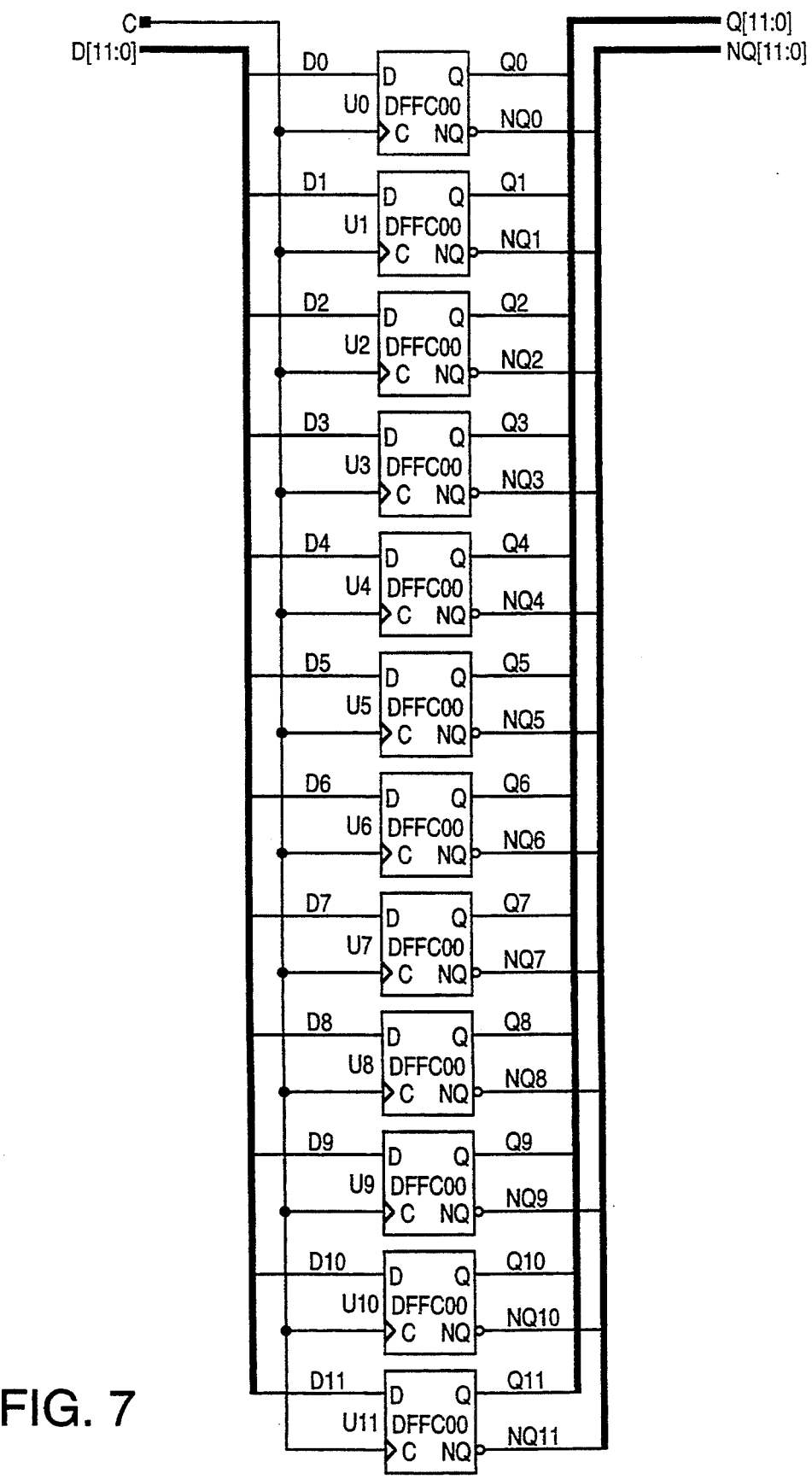
FIG. 7 is a more detailed schematic diagram of twelve bit D-type flip-flop U105 of FIG. 5B.

When the signal on terminal S0 is low and the signal on terminal S1 is high, twelve bit 4:1 multiplexer U104 selects the signals on input terminal D2_(11:0), which are grounded. Thus, the output signals on output terminal Q(11:0) of twelve bit 4:1 multiplexer U104 to twelve bit D-type flip-flop U105 (FIG. 5B), which is illustrated in more detail in FIG. 7, are all high. Thus, on the next clock pulse on line CLK, twelve bit D-type flip-flop U105 generates a logic one value on output terminal Q(11:0) and a logic zero value on terminal NQ(11:0), which drives bus BC(11:0) that carries the value of the counter.

Figures 1, 3A:
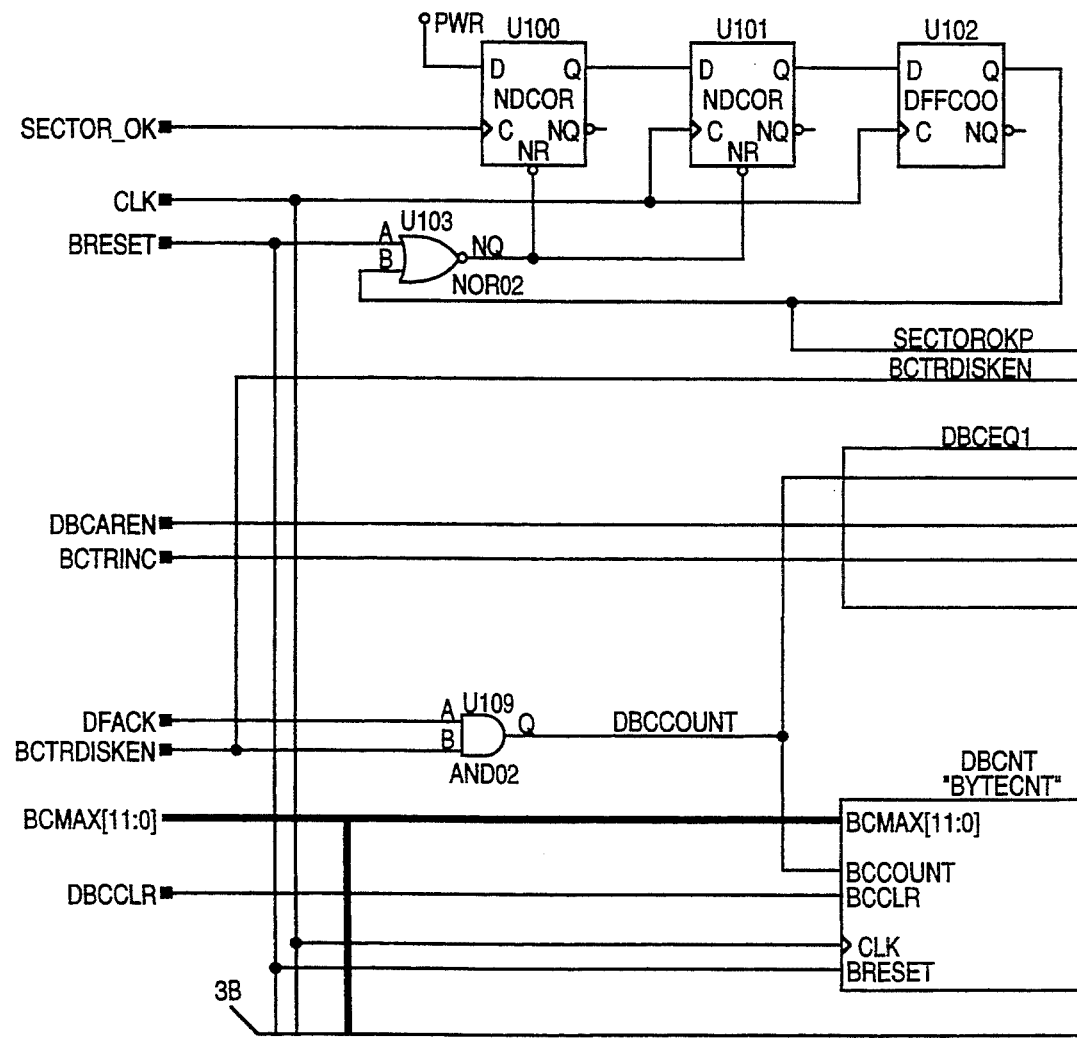
FIGS. 3A and 3B are a more detailed diagram of the disk byte counter circuit and the host byte counter circuit of FIG. 2, where FIG. 3A includes FIGS. 3A-1 and 3A-2 as shown in the Key to FIG. 3A on FIG. 3A-2, and FIG. 3B includes FIGS. 3B-1 and 3B-2 as shown in the Key to FIG. 3B on FIG. 3B-2.
Figures 2, 3A:
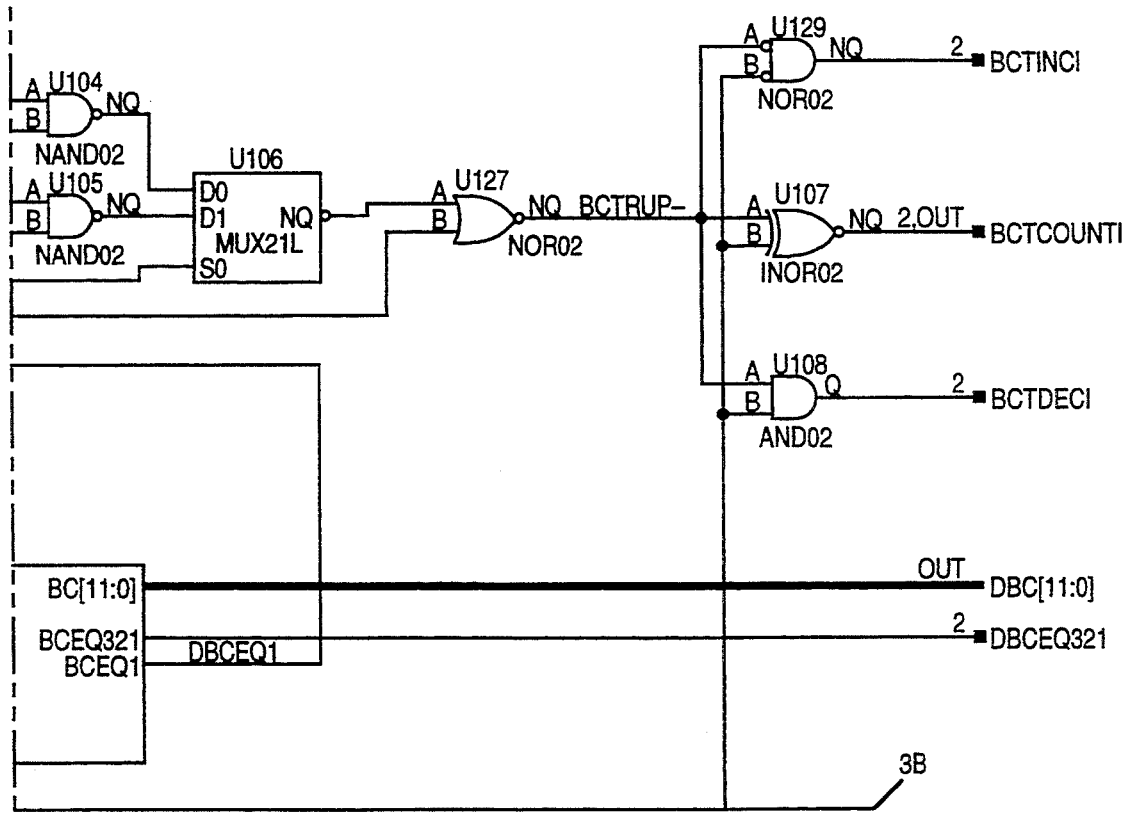
Figure 3A:
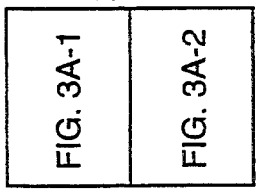

Thus, the setting of host byte counter clear bit HBCCLR and disk byte counter clear bit DBCCLR by microprocessor 210 (FIG. 2) in the write initialization process cleared host byte counter HBCNT (FIG. 3B) and disk byte counter DBCNT (FIG. 3A). In this embodiment, bits DBCCLR and HBCCLR are set for one clock pulse and then automatically reset.

Microprocessor 210 in the write initialization also sets bits BCTRLOAD and BCTRVAL. Prior to considering the specific operations in the write initialization, the general operations controlled by bits BCTRLOAD and BCTRVAL are briefly considered. Bits BCTRLOAD and BCTRVAL control loading of block counter 256. Bit BCTRLOAD is set to load block counter 256. The value loaded into block counter is determined by the second and third bits BCTRVAL. Table 2 illustrates the values loaded into block counter 256 in one embodiment.

TABLE 2

| BCTRVAL | | ACTION |
|---|---|---|
| 0 | 0 | Clear block counter |
| 0 | 1 | Load maximum number of blocks |
| 1 | 0 | Load value of block counter plus one (Increment block counter) |
| 1 | 1 | Load value of block counter minus one (Decrement block counter) |

Bits BCTRLOAD and BCTRVAL are also set for one clock pulse and then automatically reset.

As explained above, in a write operation, block counter 256 is loaded with the maximum number of blocks in buffer memory 220. Thus, in the write operation initialization, microprocessor 210 sets bit BCTRLOAD to one and bits BCTRVAL to "0,1", which in turn drives signal BCTRLDMAX to terminal BCTRLDMAX of block counter BLOCKCNT (FIG. 4B) high. In the initialization, the signals on lines BCTCOUNTI, BCTDECI, and BCTRCLR to input terminals BCTCOUNTI, BCTDECI, and BCTRCLR, respectively, of block counter BLOCKCNT are all low.

Figures 1, 4A:
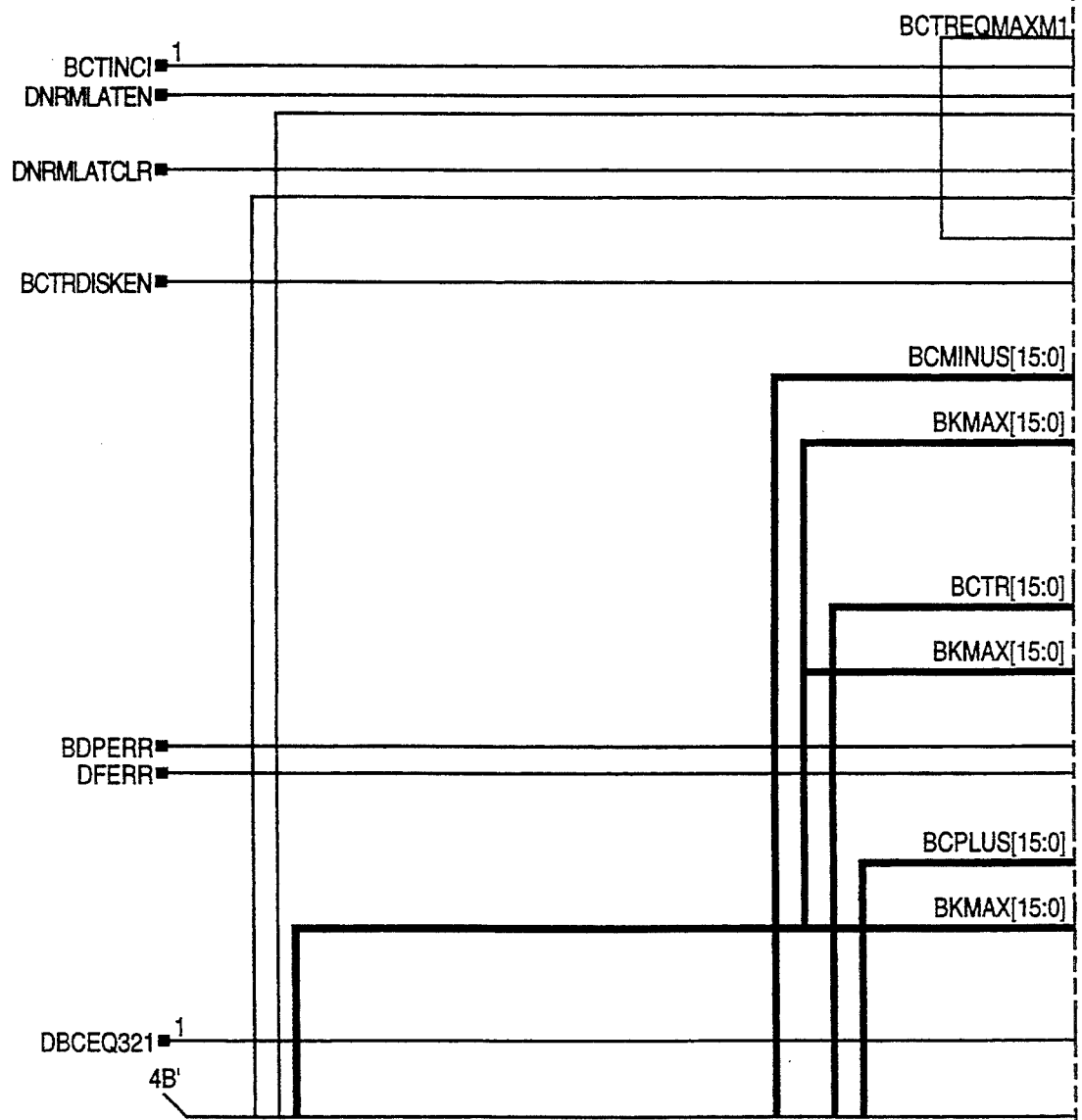
FIGS. 4A and 4B are a more detailed diagram of the block counter circuit of FIG. 2, where FIG. 4A includes FIGS. 4A-1 and 4A-2 as shown in the Key to FIG. 4A on FIG. 4A-2, and FIG. 4B includes FIGS. 4B-1 and 4B-2 as shown in the Key to FIG. 4B on FIG. 4B-2.
Figures 2, 4A:
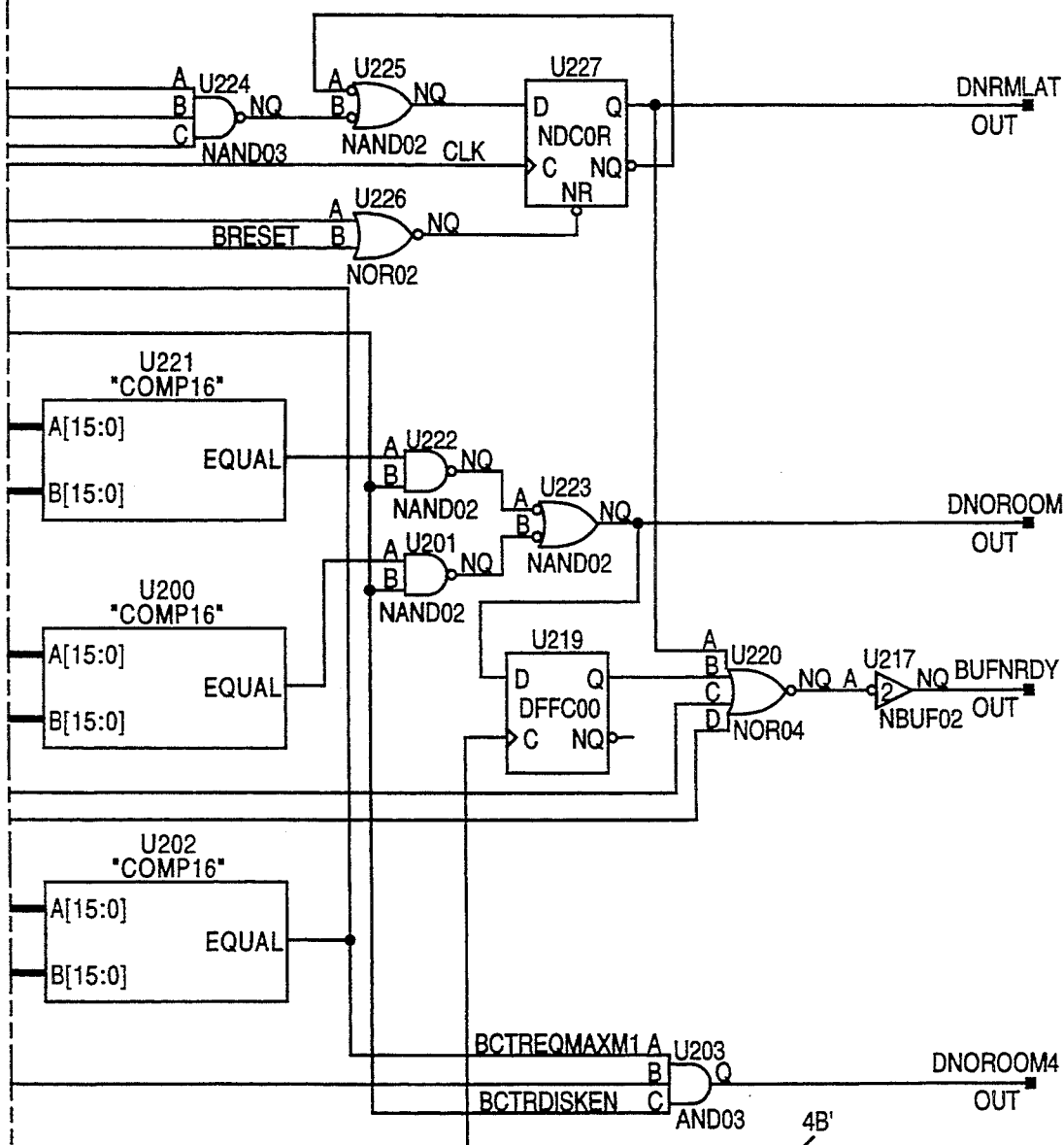
Figures 1, 4B:
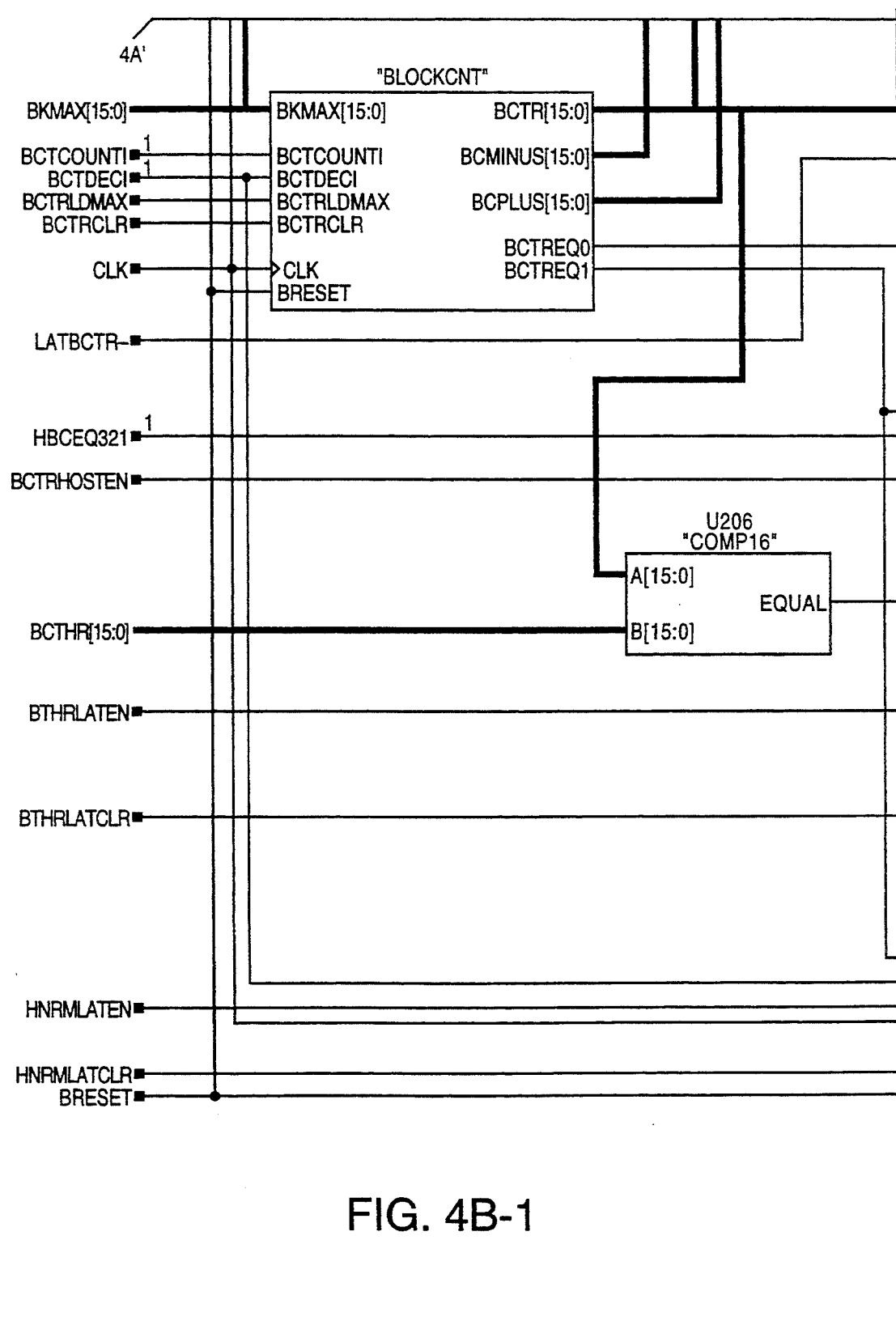
Figures 2, 4B:
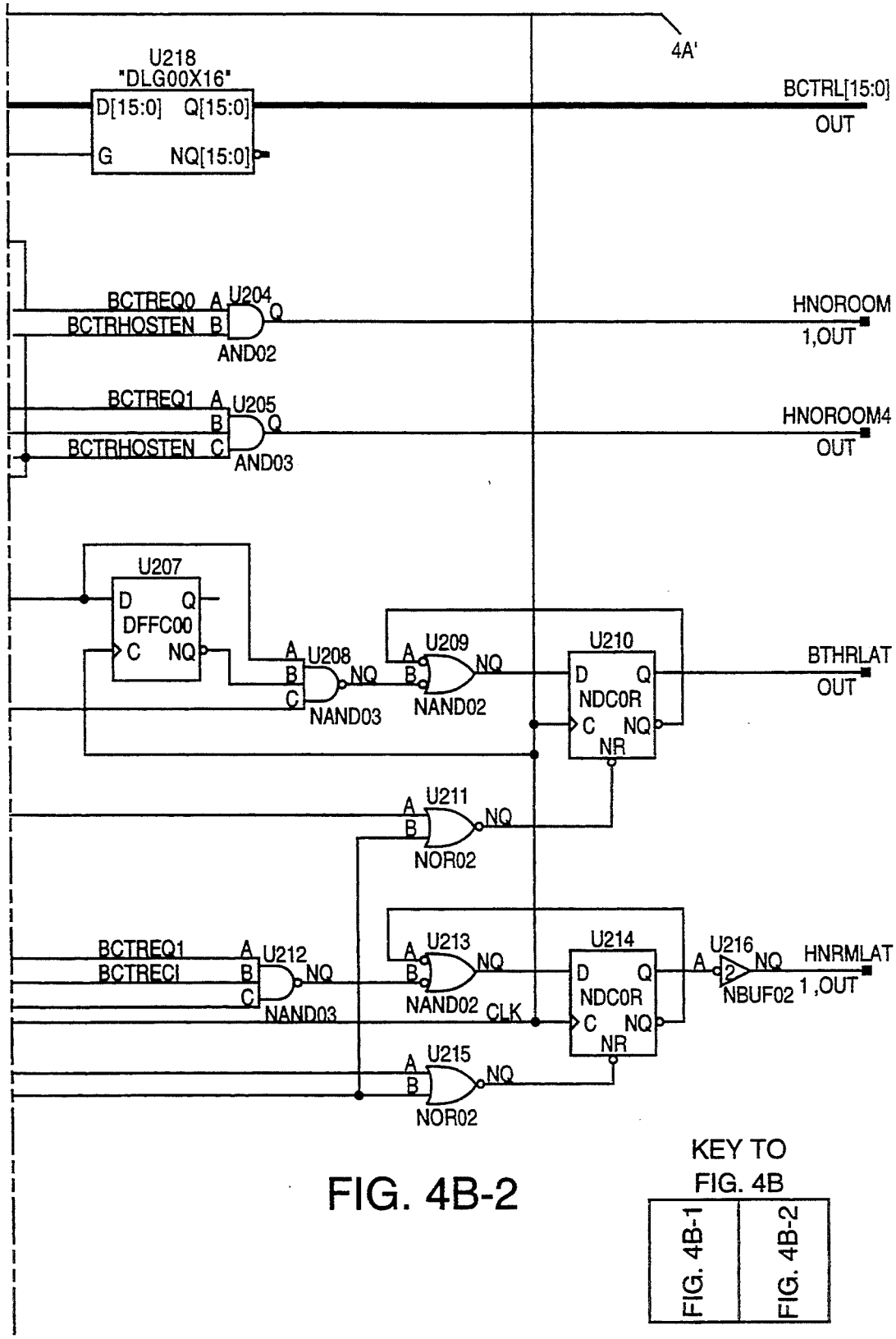

Prior to considering the initialization of block counter 256 further, the detailed structure of one embodiment of block counter 256 is described. FIGS. 4A and 4B are a more detailed schematic of block counter 256 (FIG. 2), which in this embodiment is a sixteen bit up/down programmable counter. In this embodiment, block counter 256 includes block counter BLOCKCNT which has input terminals BKMAX(15:0), BCTCOUNTI, BCTDECI, BCTRLDMAX, BCTRCLR, CLK, and BRESET. Block counter BLOCKCNT has output terminals BCTR(15:0), BCMINUS(15:0), BCPLUS(15:0), BCTREQ0 and BCTREQ1. Block counter 256 also includes four comparator circuits U221, U200, U202, and U206, which are shown in more detail in FIG. 13. Finally, block counter circuit 256 includes a sixteen bit transparent latch U218 that is connected to output terminal BCTR(15:0) of block counter BLOCKCNT and which drives bus BCTRL(15:0).

Figure 9A:
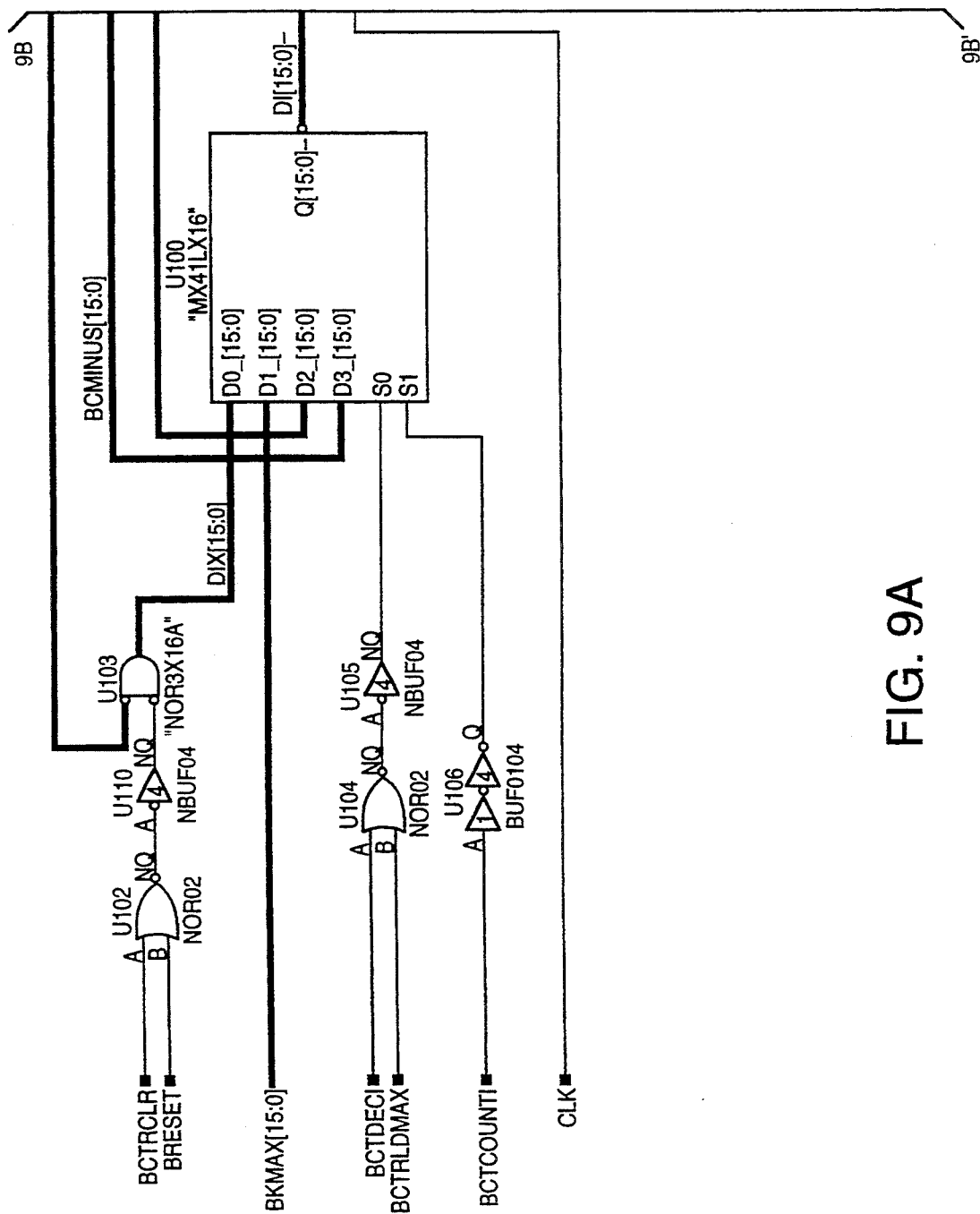

FIGS. 9A and 9B are a more detailed schematic of block counter BLOCKCNT (FIG. 4B). Briefly, block counter BLOCKCNT includes a sixteen bit 4:1 multiplexer U100 (FIG. 9A) with four input terminals, two signal select input terminals, and an output terminal that provides the complement of the signal on the selected input terminal. Again, the four input terminals and the output terminal represent a group of terminals connected to a bus. The signal from multiplexer U100 drives input terminal D of sixteen D-type flip-flop U101 (FIG. 9B). Output terminal NQ of flip-flop U101 is connected to bus BCTR and to input terminal I of logic decrement circuit DEC16. Output terminal Q of flip-flop U101 is connected to input terminal I— of logic increment circuit INC16 and to two by sixteen NOR gate U103 (FIG. 9A). Output terminal O of logic increment circuit INC16 is connected to bus BCPLUS and to input terminal D2_(15:0) of multiplexer U100. Output terminal O of decrement circuit DEC16 is connected to bus BCMINUS and to input terminal D3_(15:0).

Returning to the initialization of block counter BLOCKCNT, signals BCTDECI and BCTRLDMAX (FIGS. 4A and 9A) drive NOR gate U104 (FIG. 9A).

Figures 1, 10A:
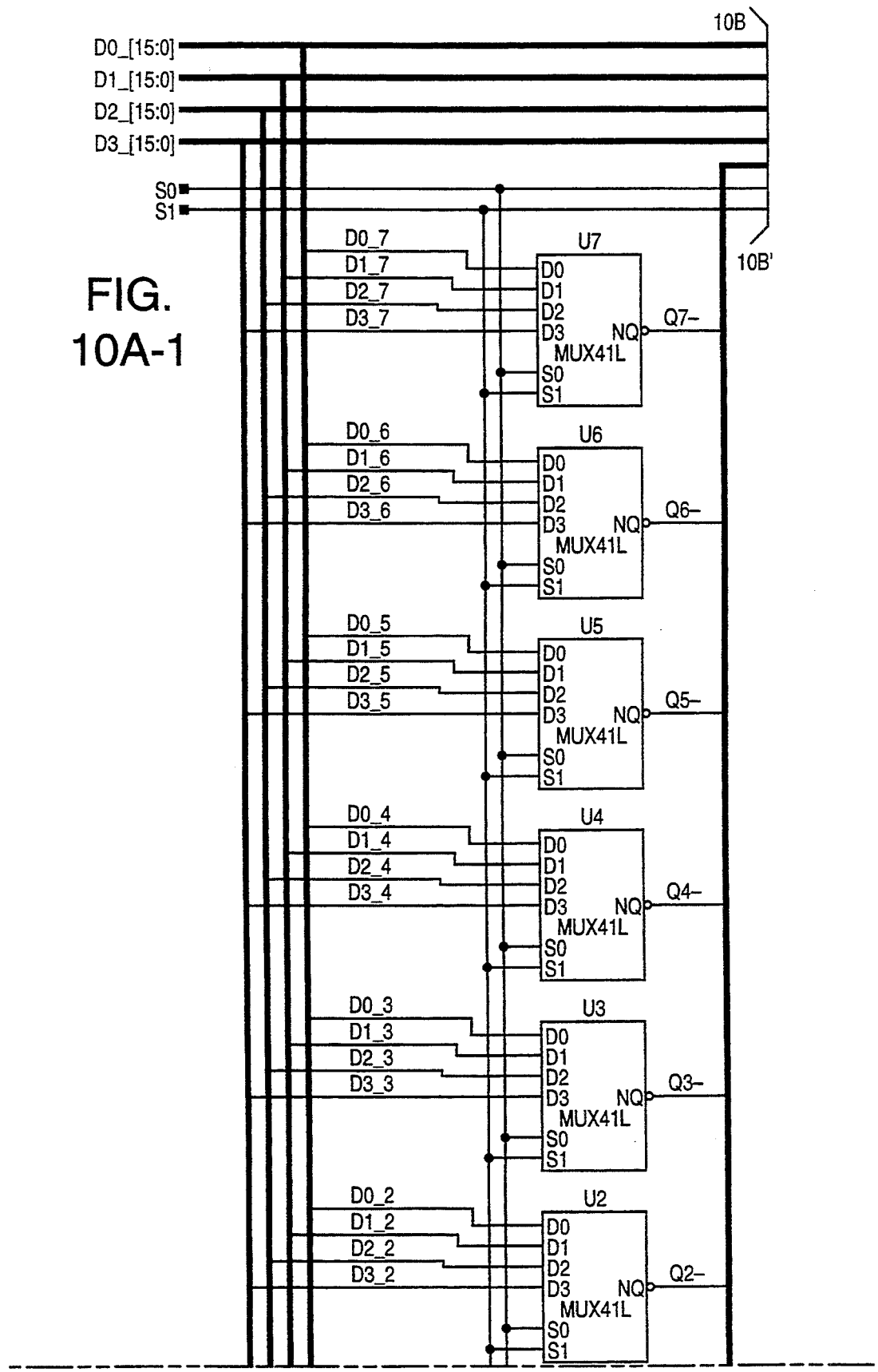
FIGS. 10A and 10B are a more detailed schematic diagram of sixteen bit 4:1 multiplexer U100 of FIG. 9A, where FIG. 10A includes FIGS. 10A-1 and 10A-2 as shown in the Key to FIG. 10A on FIG. 10A-2, and FIG. 10B includes FIGS. 10B-1 and 10B-2 as shown in the Key to FIG. 10B on FIG. 10B-2.
Figures 1, 10B:
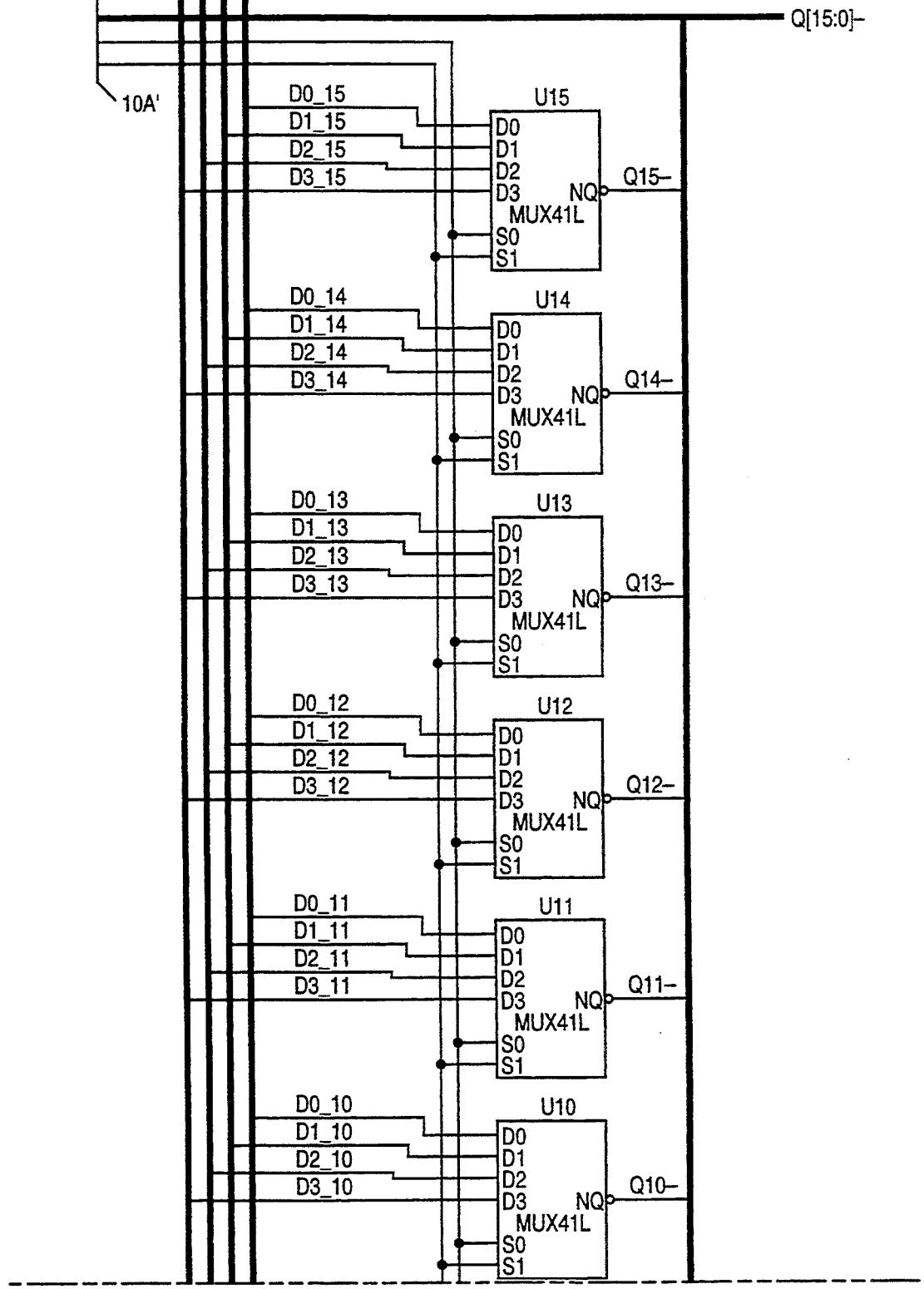
Figures 2, 10B:
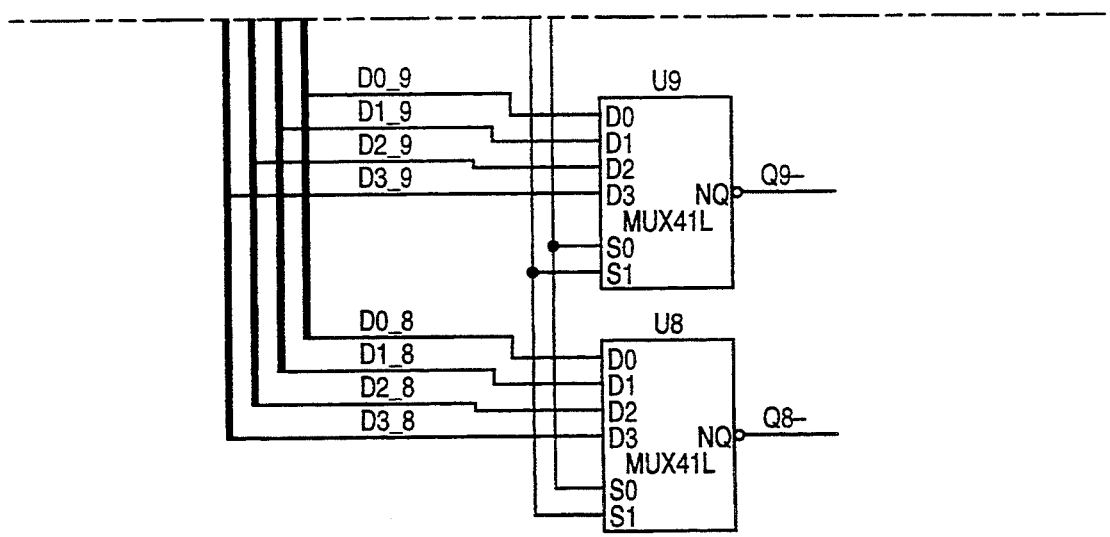
Figure 10B:
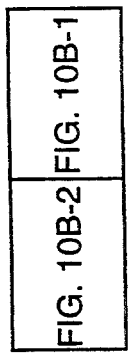

Since signal BCTRLDMAX is high during the initialization, the resulting low output signal of NOR gate U104 drives the output signal of inverter U105 high so that a high signal is applied to terminal S0 of sixteen bit 4:1 multiplexer U100, which is illustrated in more detail in FIGS. 10A and 10B. The low signal on line BCTCOUNTI is buffered by inverters U106 so that a low signal is applied to terminal S1 of sixteen bit 4:1 multiplexer U100.

When the signal on terminal S0 is high and the signal on terminal S1 is low, sixteen bit 4:1 multiplexer U100 selects the signals on input terminal D1_(15:0) which is driven by bus BKMAX(15:0), which is connected to register BKMAX (Table 1). Microprocessor 210 (FIG. 2) loads register BKMAX with the maximum number of blocks in buffer memory 220 minus one block. Thus, the output signals on output terminal Q(15:0)— (FIG. 9A) of sixteen bit 4:1 multiplexer U100 to input terminal D(15:0) of sixteen bit D-type flip-flop U101 (FIG. 9B) is the complement of the maximum number of blocks minus one block in the buffer memory. (Sixteen D-type flip-flop U101 (FIG. 9B) is similar to twelve D-type flip-flop U105 (FIG. 7) when the four bit difference in size is considered. Therefore, a detailed diagram for sixteen D-type flip-flop U101 (FIG. 9B) is not presented.) On the next clock pulse on line CLK, sixteen D-type flip-flop U101 generates the maximum number of blocks in the buffer memory 220 minus one block on terminal NQ(15:0) to bus BCTR(15:0). The value on bus BCTR(15:0) is provided to sixteen bit latch U218 (FIG. 4B). Signal LATBCTR— is normally high so that latch U218 is normally transparent and the value on the input terminal of latch U218 is transferred to bus BCTRL(15:0). Microprocessor 210 takes the signal on line LATBCTR— low when microprocessor 210 is reading the value of the block counter and does not want the value to change during the read process.

To enable decrementing block counter BLOCKCNT, microprocessor 210 (FIG. 2) sets bit BCTRHOSTEN in block counter control register BCTRCTL (Table 1). When bit BCTRHOSTEN is set, block counter BLOCKCNT (FIG. 4B) is decremented every time a whole block is transferred between the host and buffer memory 220, as explained more completely below. When bit BCTRHOSTEN is reset, host transfers, i.e., transfers between the buffer memory and bus, have no effect on block counter BLOCKCNT. Bit BCTRHOSTEN is preferably modified only when the host port is disabled.

To enable incrementing block counter BLOCKCNT (FIG. 4B), microprocessor 210 (FIG. 2) sets a bit BCTRDISKEN in block counter control register BCTRCTL (Table 1). When bit BCTRDISKEN is set, block counter BLOCKCNT (FIG. 4B) is incremented every time a whole block of data is transferred between disk and buffer memory 220. When bit BCTRDISKEN is reset, disk transfers, i.e., transfers between buffer memory 220 (FIG. 2) and disk have no effect on block counter BLOCKCNT (FIG. 4B). During read or write operations, bit BCTRDISKEN is set along with bit BCTRHOSTEN. Bit BCTRDISKEN is preferably modified only when the disk port is disabled.

Microprocessor 210 also loads register BCMAX with the number of bytes per block minus one byte. The value of register BCMAX is provided by bus BCMAX(11:0) to host byte counter HBCNT (FIG. 3B, 5A and 5B) and disk byte counter DBCNT (FIG. 3A, 5A and 5B).

Figures 1, 3B:
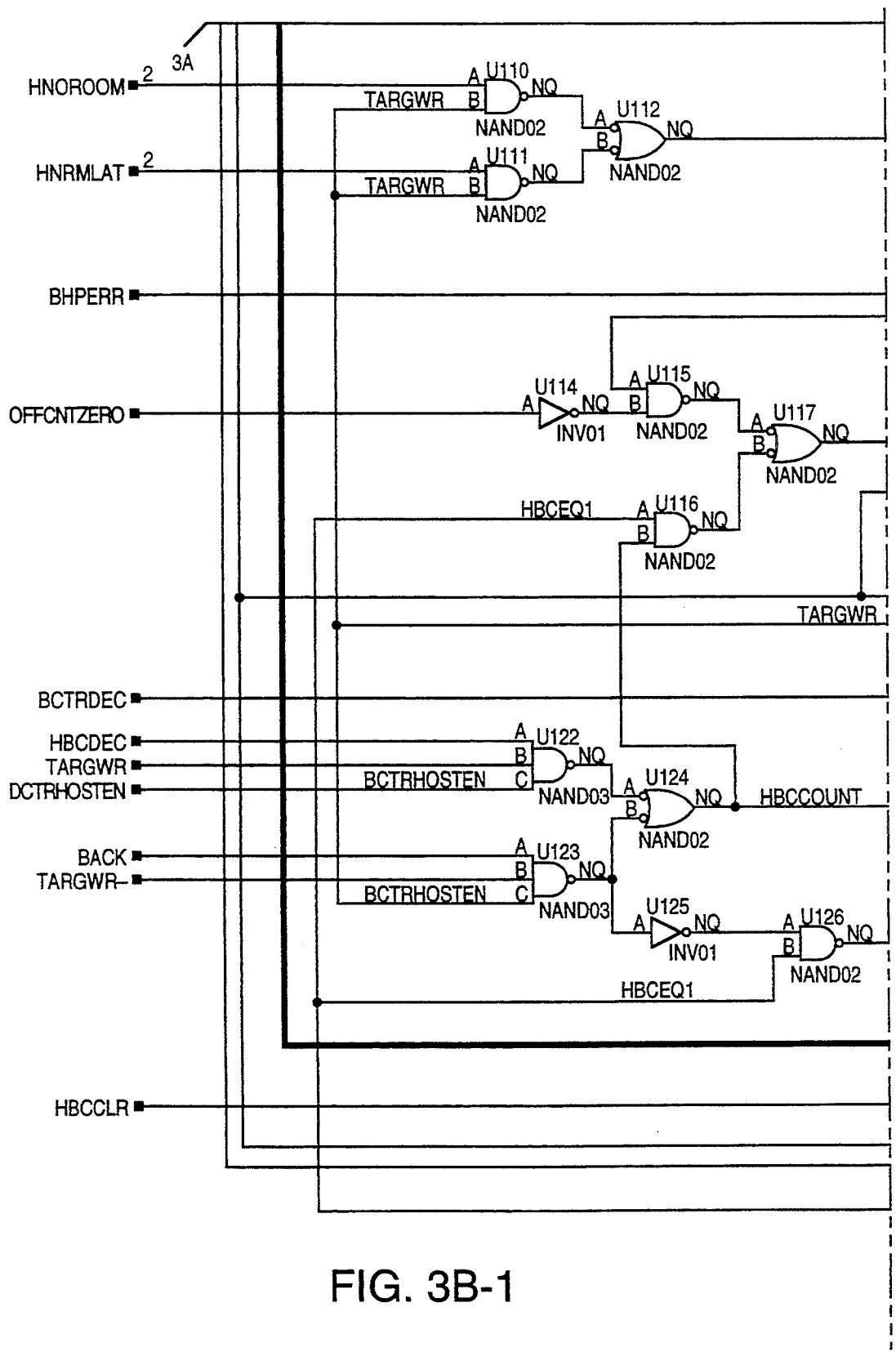
Figures 2, 3B:
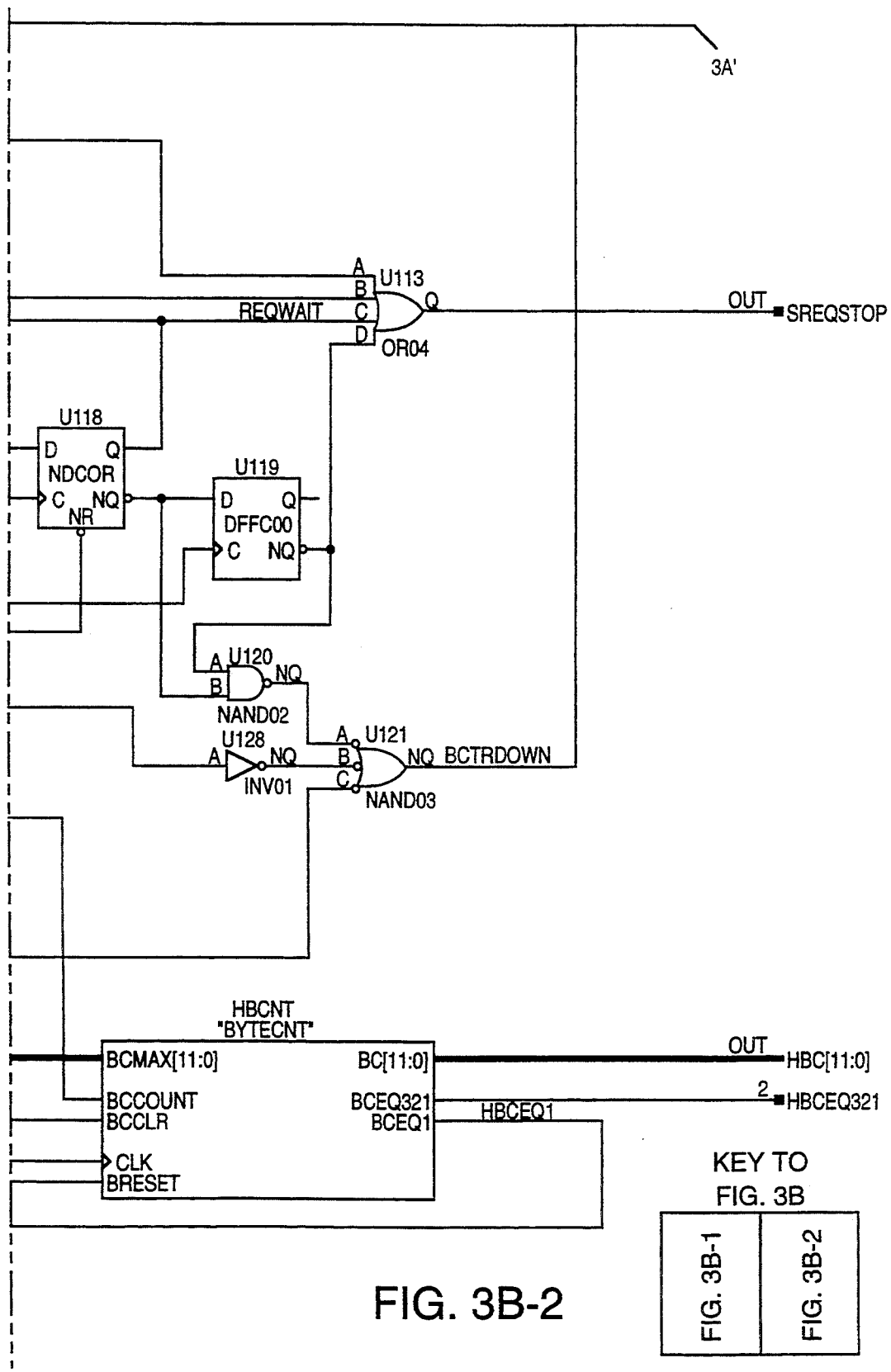

As explained above, in a write operation from SCSI bus 275 (FIG. 2) to the disk, integrated disk controller 200 is in the Write Mode which means that the signal on line TARGWR (FIG. 3B) is high and the signal on line TARGWR— is low. Also, as explained above, at the start of the transfer of each byte from SCSI bus 275 (FIG. 2) to SCSI FIFO 271 in host interface circuit 270, a pulse is generated on line HBCDEC (FIG. 3B).

Since the signal on line BCTRHOSTEN is high, as explained above, all the input signals to NAND gate U122 are high when the signal on line HBCDEC goes from low to high for the first time and so the output signal of NAND gate U122 goes from high to low which in turn drives a first input signal to NAND gate U124 low. Input signal TARGWR— to NAND gate U123 is low and input signal BCTRHOSTEN is high so that the high output signal of NAND gate U123 drives a second input signal to NAND gate U124 high. Consequently, the signal on line HBCCOUNT from NAND gate U124 to input terminal BCCOUNT of host byte counter HBCNT goes from low to high.

Figure 8A:
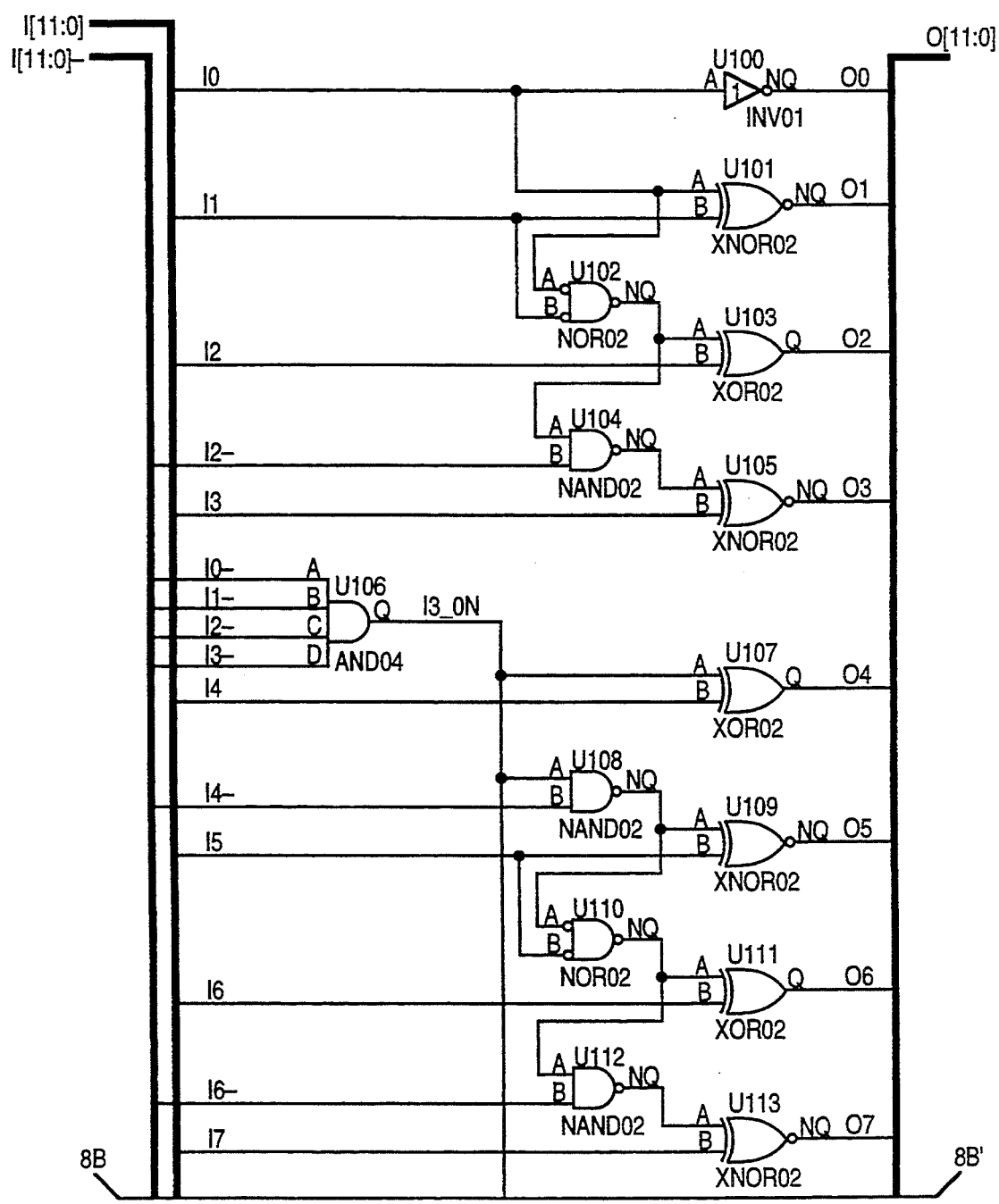
FIGS. 8A and 8B are a more detailed schematic diagram of decrement logic circuit DEC12 of FIG. 5B.
Figure 8B:
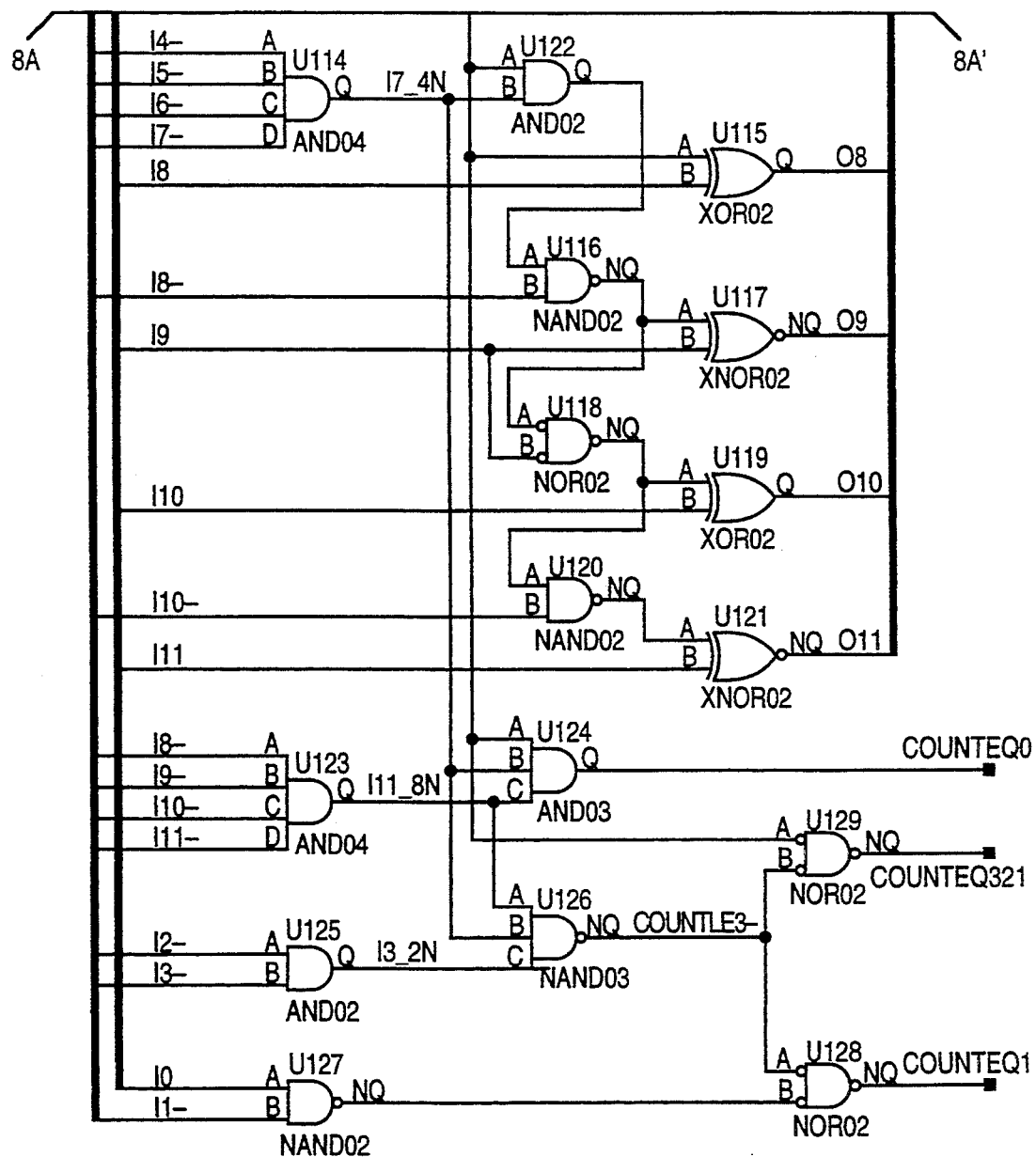

The high signal on terminal BCCOUNT if buffered by inverters U100 (FIG. 5A) and applied to terminal S0 of twelve bit 4:1 multiplexer U104. The high signal on terminal BCCOUNT is also applied to a first input terminal of NAND gate U101 (FIG. 5A). The second input terminal of NAND gate U101 is driven by the signal on line BCEQ0 from decrement circuit DEC12 (FIG. 5B and FIGS. 8A and 8B). Recall, that in the initialization, host byte counter HBCNT (FIG. 3B and FIGS. 5A and 5B) was loaded with a zero value. Thus, the signal on line BCEQ0 is high and so the output signal of NAND gate U101 is driven low. The low signal from NAND gate U101 drives the output signal of AND gate U102 low which in turn drives the output signal of inverter U103 high. The high signal from inverter U103 is applied to terminal S1 of twelve bit 4:1 multiplexer U104.

When the signal on terminal S0 is high and the signal on terminal S1 is high, twelve bit 4:1 multiplexer U104 selects the signal on input terminal D3_(11:0), which is driven by bus BCMAX(11:0), which in turn is connected to register BCMAX. Thus, the output signal on output terminals Q(11:0)— (FIG. 5A) of twelve bit 4:1 multiplexer to twelve bit D-type flip-flop U105 (FIG. 5B) is the complement of the maximum number of bytes in a block minus one byte. On the next clock pulse on line CLK, twelve bit D-type flip-flop U105 generates the value of the maximum number of bytes in a block minus one byte on output terminal NQ(11:0). The output signal of twelve bit D-type flip-flop U105 (FIG. 5B) on output terminal NQ(11:0) is the value on bus HBC(11:0) (FIG. 3B).

The output signal from terminal NQ(11:0) of twelve bit D-type flip-flop U105 is fed back to input terminal D0_(11:0) of twelve bit 4:1 multiplexer U104 and applied to input terminal I(11:0) of decrement circuit DEC12. (FIGS. 5A and 5B). Decrement circuit DEC12 subtracts one from the value on its input terminal and the output signal on output terminal Q(11:0) of decrement circuit DEC12 is applied to input terminal D1_(11:0) of twelve bit 4:1 multiplexer U104. When the value of the counter equals zero, the signal on line BCEQ0 goes low.

Thus, the first pulse to host byte counter HBCNT on line HBCDEC causes host byte counter value HBC to roll over from the initial zero value to a value equal to the number of bytes in a block minus one byte. When the signal on line BCEQ0 (FIG. 5A) goes low, the logic driving terminal S1 of twelve bit 4:1 multiplexer U104 also goes low and remains low until the signal on line BCEQ0 goes high again. Thus, the signal passed through twelve bit 4:1 multiplexer U104 is determined by the signal level on line BCCOUNT until line BCEQ0 goes high again. Specifically, when signal BCCOUNT is low, the value of the counter is passed through multiplexer U104 and when signal BCCOUNT goes high, the decremented value of the counter is passed through multiplexer U104.

Hence, as each subsequent byte is loaded from SCSI bus 275 into SCSI FIFO 271, the pulse on line HBCDEC drives the signal on line HBCCOUNT high which in turn drives terminal BCCOUNT of host byte counter HBCNT high. The high signal on terminal BCCOUNT is applied to terminal S0 of twelve bit 4:1 multiplexer U104 (FIG. 5A) and so the decremented value on terminal D1_(11:0) is loaded into twelve bit D-type flip-flop U105 (FIG. 5B). Thus, host byte counter value HBC is decremented as each byte of data is transferred between the SCSI bus and the buffer memory.

When host byte counter value HBC (FIG. 3B) is one, the signal on line BCEQ1 from decrement circuit DEC12 (FIG. 5B) goes high which in turn drives the signal on line HBCEQ1 (FIG. 3B.) high. High signal HBCEQ1 is a first input signal to NAND gate U116. The second input signal to NAND gate U116 is provided by line HBCCOUNT. Thus, as the next byte is transferred from the SCSI bus to the buffer memory, the output signal of NAND gate U116 goes low and in turn drives the output signal of NAND gate U117 high. This high signal is clocked through D-type flip-flop U118 to OR gate U113. The resulting high signal from OR gate U113 drives line SREQSTOP. High signal SREQSTOP causes the host interface circuit to stop generating SCSI request signal REQ.

The high signal from flip-flop U118 is also fed back to NAND gate U115, which is also driven by the inverse of the signal on line OFFCNTZERO. The host interface circuit sets signal OFFCNTZERO high when the SCSI acknowledge signal ACK for the last byte in the block is received. High signal OFFCNTZERO drives the signal of inverter U114 low which in turn drives the output signal of NAND gate U115 high. The high signal from NAND gate U115 drives the output signal of NAND gate U117 low because at this time the signal on line HBCEQ1 has gone low. This low signal is clocked through flip-flop U118 to OR gate U113. Thus, the signal on line SREQSTOP goes low unless the signal on either line HNOROOM or line HNRMLAT is high, as described more completely below.

When the output signal on output terminal Q of flip-flop U118 was high, the signal on output terminal NQ was low. This low signal was clocked into D-type flip-flop U119 so that the high signal on output terminal NQ of this flip-flop to a first input terminal of NAND gate U120 was high. The low signal on output terminal NQ of flip-flop U118 is also applied to a second input terminal of NAND gate U120. Hence, when the signal on output terminal Q of flip-flop U118 goes low and the signal on output terminal NQ goes high, the output signal of NAND gate U120 is driven low. This low signal drives the output signal of NAND gate U121 on line BCTRDOWN high.

Signal BCTRDOWN (FIG. 3B) drives one input terminal of NOR gate U129, one input terminal of Exclusive NOR gate U107, and one input terminal of AND gate U108 (FIG. 3A). The output signals of gates U129, U107, and U108 control the incrementing and decrementing of block counter BLOCKCNT (FIG. 4B). The output signals of gates U129, U107, and U108 are determined by signal BCTRUP— which is connected to a second input terminal of each of gates U129, U107, and U108 and signal BCTRDOWN.

During a transfer between the SCSI bus and the buffer memory, signal BCTRUP— from NOR gate U127 is high. Thus, with signal BCTRDOWN high, signal BCTCOUNTI from Exclusive NOR gate is high and signal BCTDECI from AND gate U108 is high. Prior to receiving high signal BCTRDOWN, signal BCTINCI was low, signal BCTCOUNTI was low, and signal BCTDECI was low.

To understand the effect on block counter BLOCKCNT (FIG. 4B) when signal BCTRDOWN goes high, the structure of block counter BLOCKCNT is considered in more detail at this time. As described above, bus BKMAX(15:0) is connected to input terminals D1_(15:0) of sixteen bit 4:1 multiplexer U100 (FIG. 9A). The complement of the value of block counter BLOCKCNT is passed though two by sixteen NOR gate U103 (a two by sixteen NOR gate is sixteen NOR gates with each NOR gate having two input terminals) which also receives signal BCTRCLR as derived from bits BCTRVAL in register BCTRCTL. Output signal DIX(15:0) from NOR gate 103 drives input terminal D0_(15:0) of sixteen bit 4:1 multiplexer U100 (FIG. 9A). When bits BCRTVAL are "0,0" signal BCTRCLR is high so that input terminal D0_(15:0) receives all logic zero signals. Otherwise, input terminal D0_(15:0) receives the value of block counter BLOCKCNT.

Figure 11A:
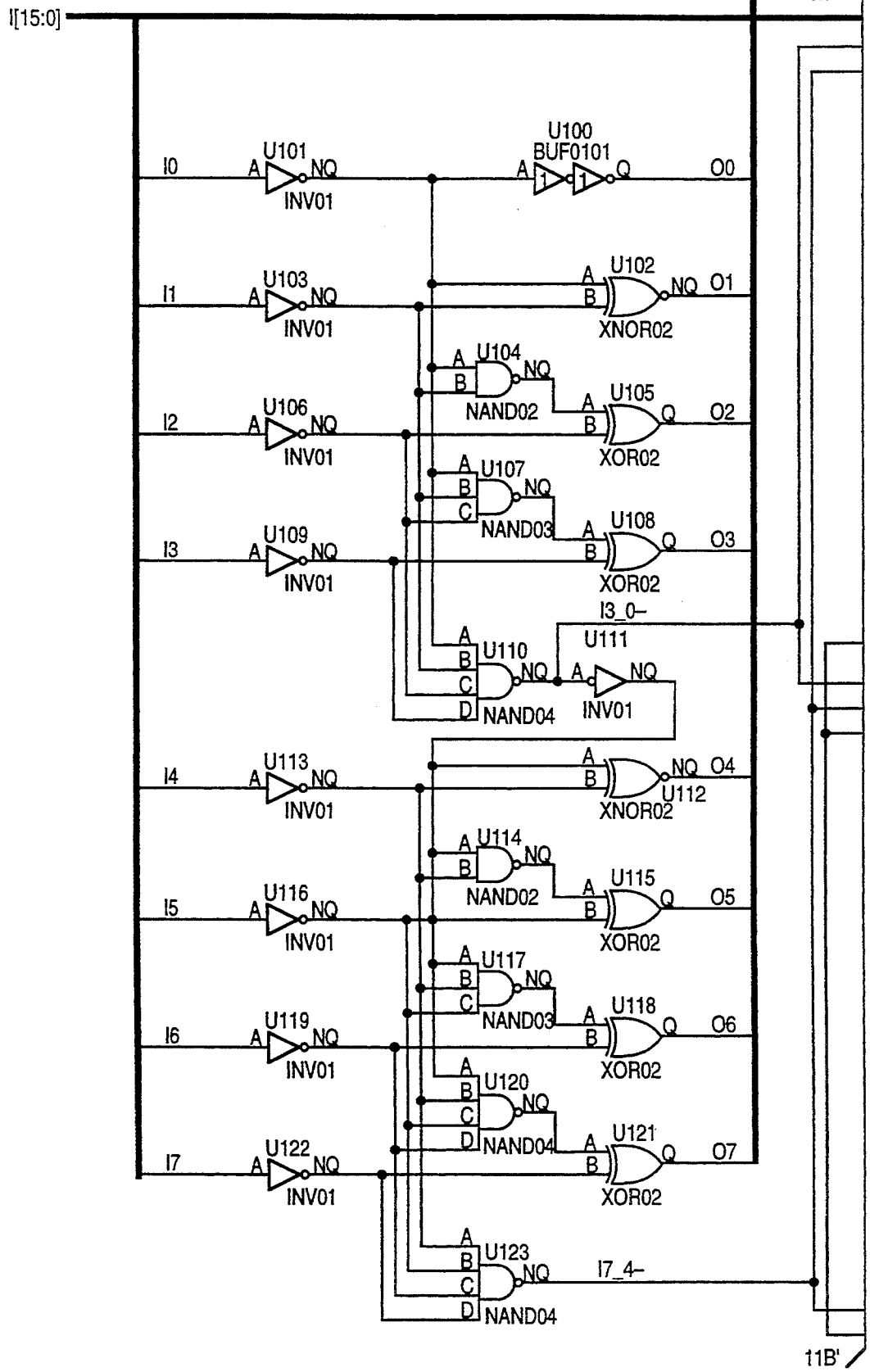
FIGS. 11A and 11B are a more detailed schematic diagram of decrement logic circuit DEC16 of FIG. 9B.
Figure 11B:
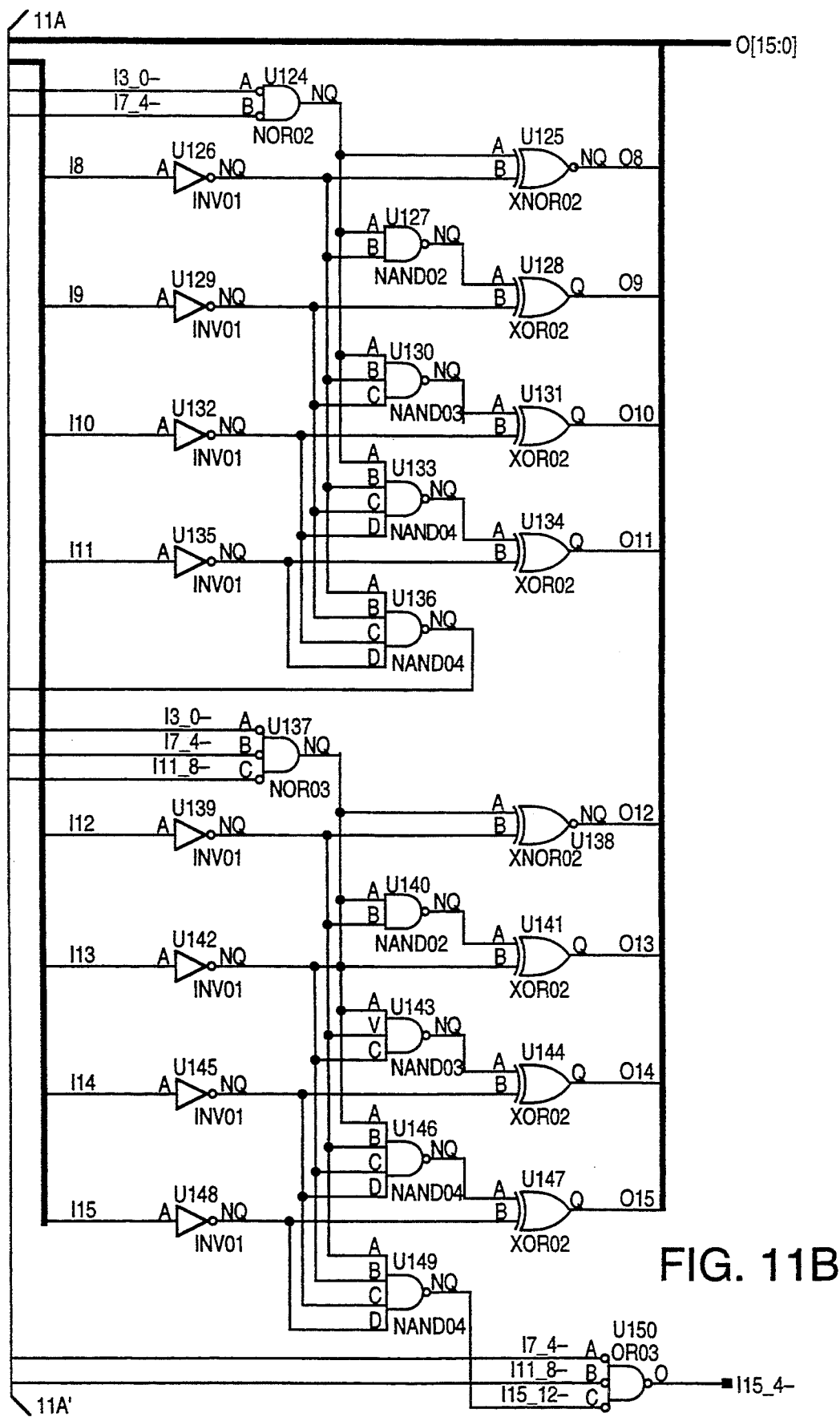
Figure 12A:
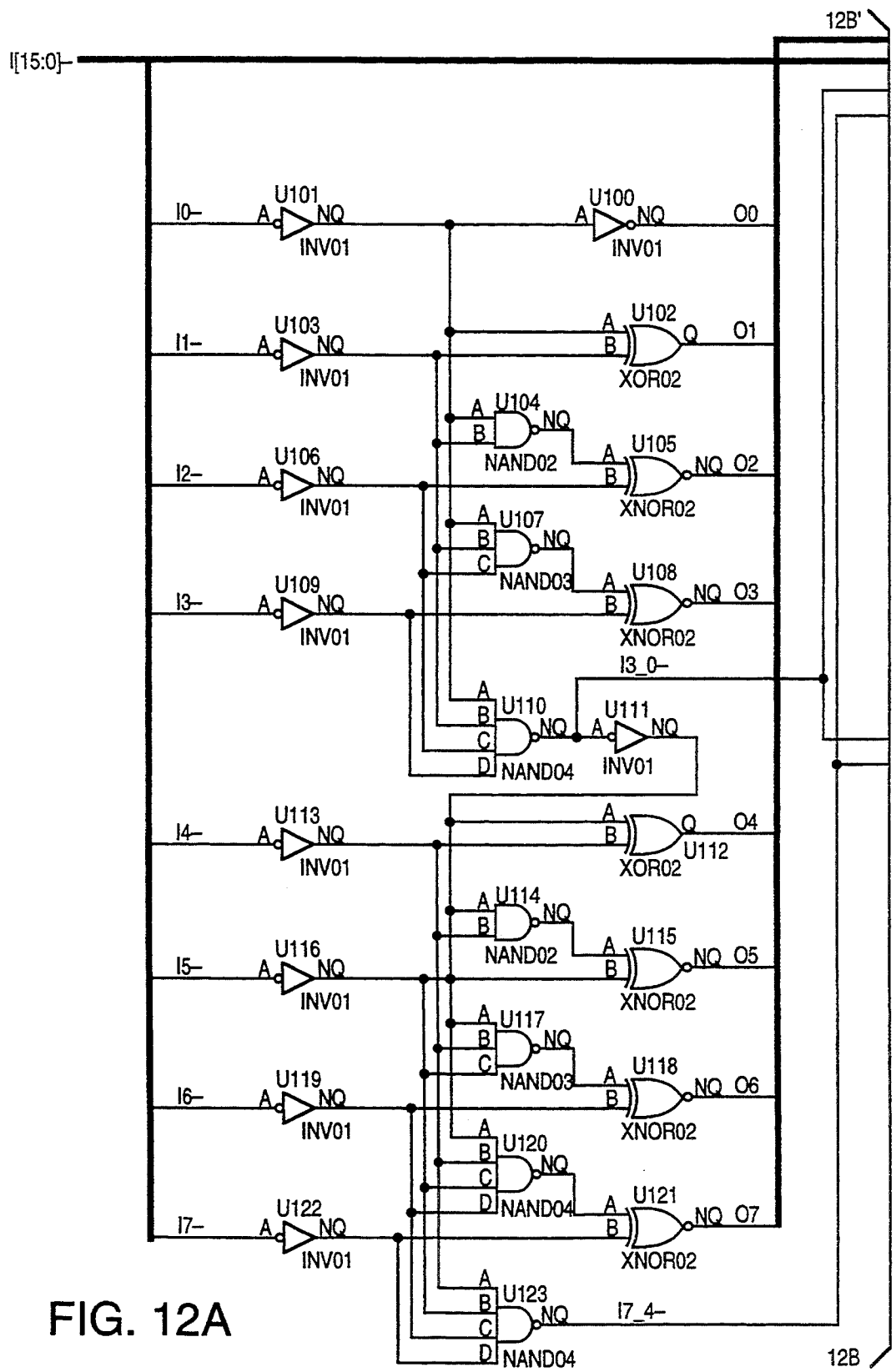
FIGS. 12A and 12B are a more detailed schematic diagram of increment logic circuit INC16 of FIG. 9B.
Figure 12B:
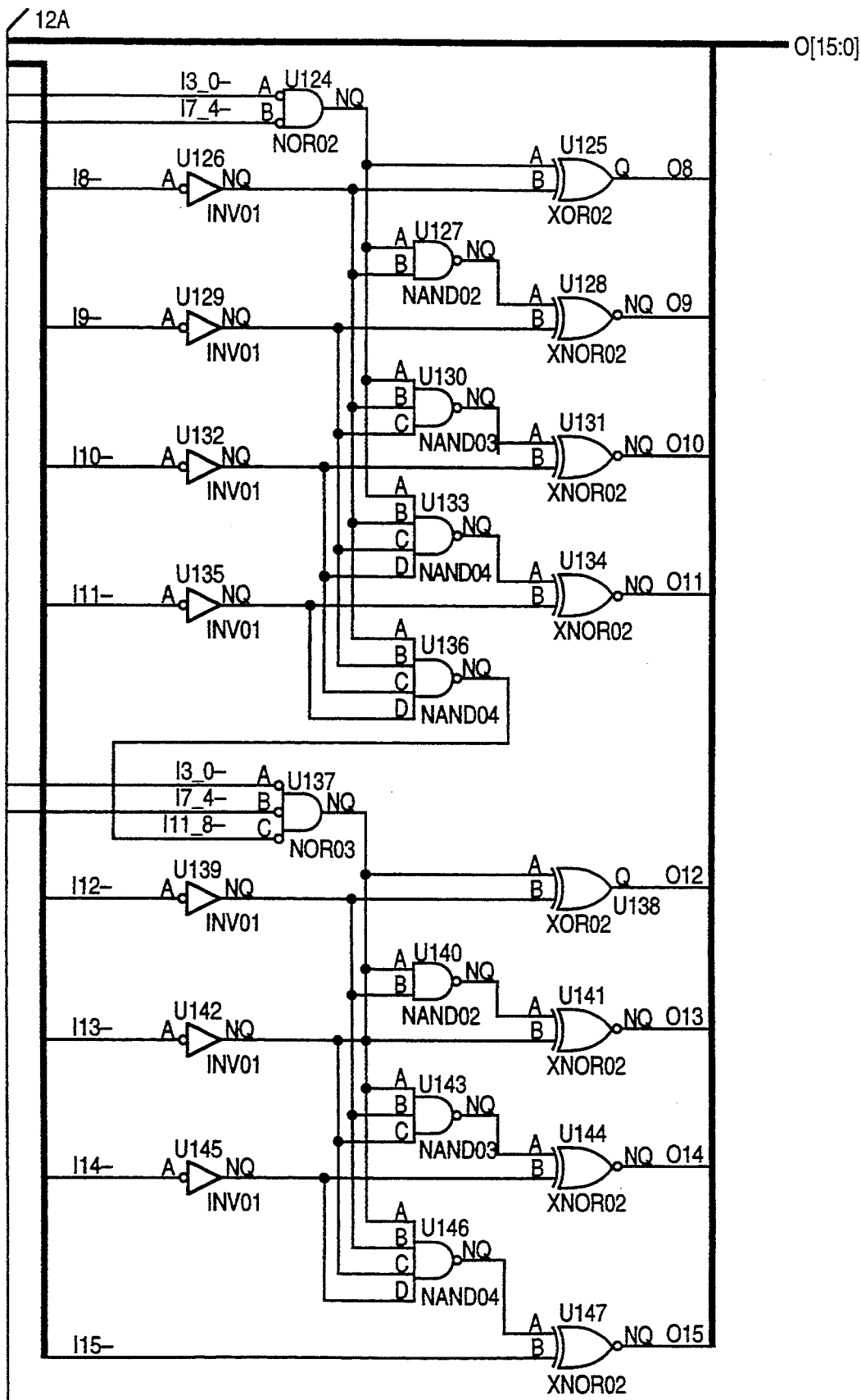
Figure 13:
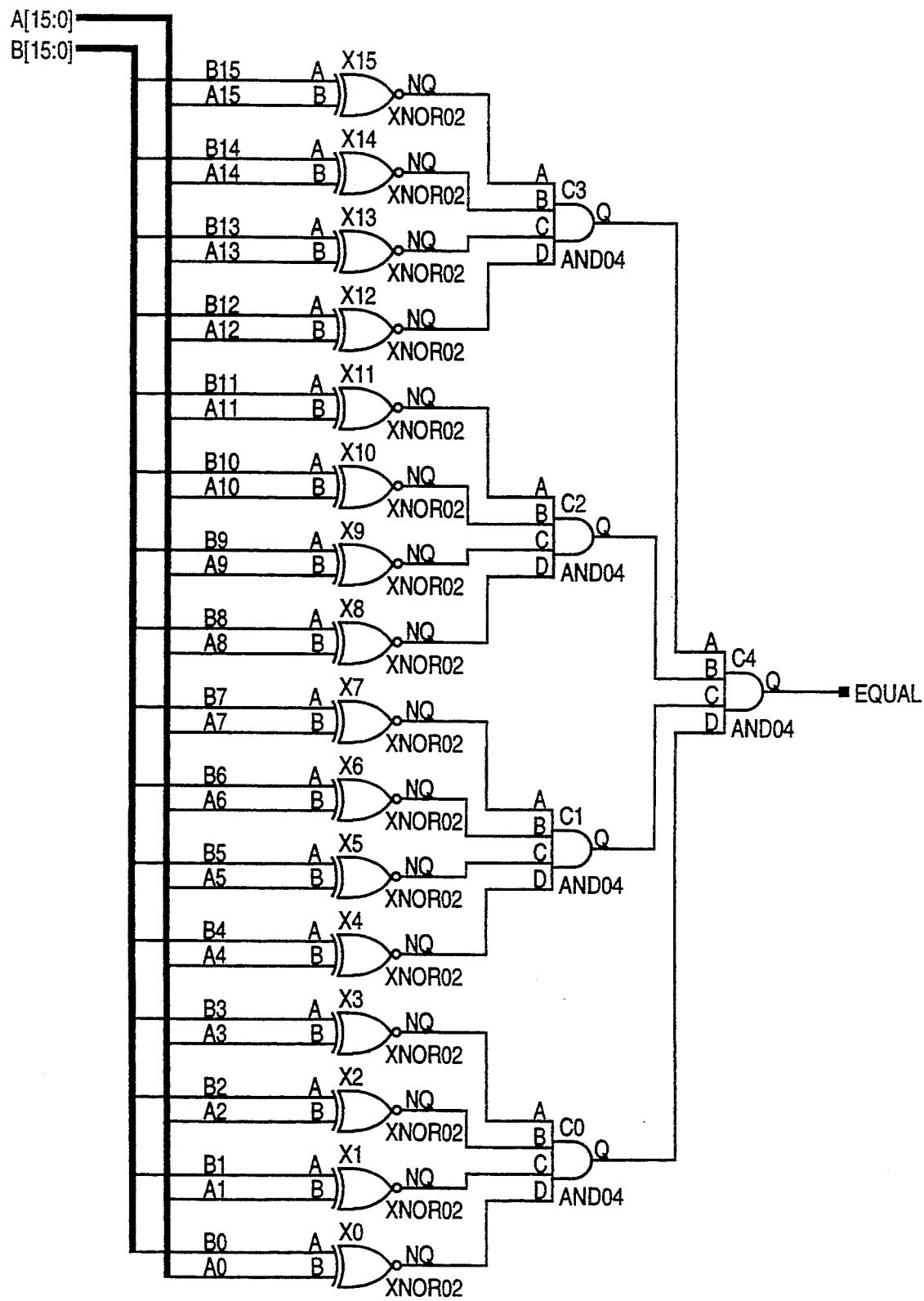
FIG. 13 is a more detailed schematic diagram of sixteen bit comparators U221, U200, and U202 of FIG. 4A and U206 of FIG. 4B.

Input terminal D2_(15:0) of sixteen bit 4:1 multiplexer U100 (FIG. 9A) receives the signal on output terminal O(15:0) of increment circuit INC16 (FIG. 9B), which is shown in more detail in FIGS. 11A and 11B. The output signal of increment circuit INC16 is the value of block counter BLOCKCNT plus one. Input terminal D3_(15:0) of sixteen bit 4:1 multiplexer U100 (FIG. 9A) receives the signal on output terminal O(15:0) of decrement circuit DEC16 (FIG. 9B), which is shown in more detail in FIGS. 12A and 12B. The output signal of decrement circuit DEC16 is the value of block counter BLOCKCNT minus one.

As explained above, prior to host byte counter HBCNT reaching a value of one, signal BCTCOUNTI (FIG. 3A) to input terminal BCTCOUNTI of block counter BLOCKCNT (FIG. 4B) was low, and signal BCTDECI (FIG. 3A) to input terminal BCTDECI of block counter BLOCKCNT (FIG. 4B) was low. Signal BCTCOUNTI is buffered and applied to input terminal S1 of sixteen bit 4:1 multiplexer U100 (FIG. 9A). Similarly, signal BCTDECI is buffered and applied to input terminal S0 of sixteen bit 4:1 multiplexer U100 (FIG. 9A). Thus, prior to host byte counter HBCNT reaching a value of one, the value of block counter BLOCKCNT on input terminal D0_(15:0) was selected as the input signal to sixteen bit 4:1 multiplexer U100.

When signal HBECEQ1 (FIG. 3B) goes high from host byte counter HBCNT and line BCTRDOWN is driven high as a result, signal BCTCOUNTI from Exclusive NOR gate (FIG. 3A) is driven high and signal BCTDECI from AND gate U108 is also driven high. Thus, signal select terminals S0 and S1 of sixteen bit 4:1 multiplexer U100 (FIG. 9A) are both high. Therefore, the value of decrement circuit DEC16 (FIG. 9B) on input terminal D3_(15:0) (FIG. 9A) is selected as the input signal to sixteen bit 4:1 multiplexer U100. Hence, the complement of the value of block counter BLOCKCNT minus one is loaded into sixteen bit D-type flip-flop U101 (FIG. 9B) on the next clock pulse on line CLK. The signal on output terminal NQ(15:0) of sixteen bit D-type flip-flop U101 is applied to input terminals I(15:0) of decrement circuit DEC16 which decrements the value by one. The signal on output terminal Q(15:0) of flip-flop U101 is applied to input terminal terminals I(15:0)— of increment circuit IN16, which increments the value by one.

Thus, when host byte counter value HBC (FIG. 3B) reaches zero, a block of data has been transferred to buffer memory 220 and block counter BLOCKCNT (FIG. 4B) was decremented to indicate that one block less of memory is available in buffer memory 220. Also, when host byte counter value HBC reaches zero, signal BCEQ0 from decrement circuit DEC12 (FIG. 5B) goes high.

At the start of the transfer of the next block from the SCSI bus to the buffer memory, when the signal on line BCCOUNT (FIG. 5A) goes high, the output signal of NAND gate U101 goes low which in turn drives the output signal of AND gate U102 low. Inverter U103 receives this low signal and in response applies a high signal to terminal S1 of twelve bit 4:1 multiplexer U104 (FIG. 5A). Signal BCCOUNT is again buffered and applied to input terminal S0. Hence, as explained above, host byte counter HBCNT rolls over from zero to the value on bus BCMAX(11:0), which is the value equal to the number of bytes in a block minus one byte. When the second complete block is in buffer memory 220, block counter 256 is again decremented, as described above for the first block.

As explained above, transfers between buffer memory 220 and the disk and buffer memory 220 and SCSI bus 275 take place concurrently. Thus, buffer control circuit 240, in response to signals from microprocessor 210, may start to transfer data that has been loaded in buffer memory 220 to the disk. As each byte is transferred from buffer memory 220 to disk, a pulse is generated on line DFACK to disk byte counter 252.

Recall that, as described above, disk byte counter DBCNT (FIG. 3A) and host byte counter HBCNT (FIG. 3B) have an identical structure. Also, in the initialization for the write to disk, bit DBCCLR was set. In response to the high signal on line DBCCLR to input terminal BCCLR of disk byte counter DBCNT (FIG. 3A), disk byte counter DBCNT is initialized in the same manner as host byte counter HBCNT was in response to a high signal on line HBCCLR. Accordingly, that description of that initialization is incorporated herein by reference.

The first pulse to disk byte counter DBCNT (FIG. 3A) on line DFACK generates a pulse on line DBCCOUNT from AND gate U109 because in the initialization, bit BCTRDISKEN was set. Each pulse on line DBCCOUNT decrements disk byte counter DBCNT in the same manner as a pulse on line HBCCOUNT decremented host byte counter HBCNT. Accordingly, the above description for decrementing host byte counter HBCNT is incorporated herein by reference. Hence, as each subsequent byte is transferred from buffer memory to the disk, the pulse on line DFACK and the resulting pulse on line DBCCOUNT decrements disk byte counter DBCNT.

When disk byte counter DBCNT has a value of one, the signal on line DBCEQ1 goes high. Signal DBCEQ1 and signal DBCCOUNT drive NAND gate U105. Thus, the next pulse on line DFACK drives signal DBCCOUNT high, which in turn drives the output signal of NAND gate U105 low. The low signal from NAND gate U105 is applied to input terminal D1 of 2:1 multiplexer U106.

Recall, that in the write operation, bit DBCAREN is set so that a high signal is applied to input terminal S0 of 2:1 multiplexer U106. Consequently, multiplexer U106 inverts the low output signal of NAND gate U105 and applies a high signal to NOR gate U127. Thus, the output signal of NOR gate U127 on line BCTRUP— is low.

At this time the signal on line BCTRDOWN (FIG. 3B) to gates U107 and U108 (FIG. 3A) is low. Thus, signal BCTCOUNTI from gate U107 is high and signal BCTDECI from gate U108 is low. As described above, signals BCTDECI and BCTCOUNTI are effectively applied to input terminals S0 and S1 of sixteen bit 4:1 multiplexer U100 (FIG. 9A) of block counter BLOCKCNT. Thus, multiplexer U100 passes the complement of the signal on input terminal D2_(15:0) from increment circuit INC16 (FIG. 9B) to input terminal D(15:0) of sixteen bit D-type flip-flop U101.

When disk byte counter DBCNT (FIG. 3A) reaches a value of zero, a block of data has been transferred from buffer memory 220 to disk and block counter BLOCKCNT (FIG. 4B) is incremented to indicate that one block more of memory is available in buffer memory 220. Upon the start of the transfer of the next block of data from buffer memory 220 to the disk, the pulse on line DFACK again causes disk byte counter DBCNT to roll over from a zero value to the value equal to the number of bytes in a block minus one byte. When the second complete block is transferred from buffer memory 220, block counter 256 is again incremented.

Hence, in the write operation, disk byte counter DBCNT (FIG. 3A) and host byte counter HBCNT (FIG. 3B) increment and decrement respectively, block counter BLOCKCNT (FIG. 4B). Consequently, microprocessor 210 is not required to maintain and monitor pointers for buffer memory 220 as in the prior art systems.

The writing of data to disk continues until block counter BLOCKCNT reaches either a zero value or the predetermined maximum value. If block counter BLOCKCNT (FIG. 4B) reaches a value of one, the signal on line BCTREQ1 goes high. Signals BCTREQ1, BCTDECI and HNRMLATEN are input signals to NAND gate U212.

Signal HNRMLATEN is driven by a host no room latch enable bit, which is initialized by microprocessor 210 in the initialization sequence. Microprocessor 210 sets this enable bit to prevent host transfers from restarting until microprocessor 210 clears the bit. Typically, the bit is set when disconnection from the SCSI bus is possible so that other devices can use the SCSI bus until room becomes available in the buffer memory. Alternatively, if the host no room latch enable bit is not set, no data are accepted from the SCSI bus until room becomes available in the buffer memory, as described more completely below.

Thus, if signal HNRMLATEN is high and signal BCTREQ1 is high, the output signal of NAND gate U212 goes low when signal BCTDECI goes high. The circumstances under which signal BCTDECI goes high were described above and that description is incorporated wherein by reference. The low signal from NAND gate U212 drives the signal from NAND gate U213 high. The high signal from NAND gate U213 is clocked into D-type flip-flop U214 on the next clock pulse on line CLK. Consequently, the signal on output terminal NQ goes low which in turn drives the output signal of inverter U216 on line HNRMLAT high. The signal on line HNRMLAT sets a status bit for microprocessor 210.

This sequence of events was initiated by block counter BLOCKCNT (FIG. 4B) having a value of one and then decrementing to zero. When block counter BLOCKCNT reaches a value of zero, the signal on line BCTREQ0 goes high. Since signal BCTRHOSTEN is high, high signal BCTREQ0 drives the output signal of AND gate U204 on line HNOROOM high.

Since this is a write operation, the signal on line TARGWR (FIG. 3B) is high and the high signal on line HNOROOM drives the output signal of NAND gate U110 low. This low signal drives the output signal of NAND gate U112 to OR gate U113 high which in turn generates a high signal on line SREQSTOP. The high signal on line HNRMLAT also drives the signal on line SREQSTOP high. As described above, host interface circuit 270 stops generating SCSI request signal REQ when signal SREQSTOP is high. Thus, when buffer memory 220 is full the data transfer from the SCSI bus to the buffer memory is stopped so that a buffer overrun does not occur.

If the latched signal is used, microprocessor 210 must intervene to clear the latched signal. However, if the latched signal is not used, signal SREQSTOP remains high until data are moved from the buffer memory to disk so that block counter BLOCKCNT (FIG. 4B) is incremented and signal BCTREQ0 goes low and thereby drops signal SREQSTOP. Also, a threshold enable bit may be set by microprocessor 210 and a threshold value loaded in the threshold register so that comparator U206 (FIG. 4B), flip-flop U207 and U210, and gates U208, U209 and U211 set the signal on line BTHRLAT. The signal on line BTHRLAT is used to instruct microprocessor to reconnect to the SCSI bus after a certain threshold amount of space is available in the buffer memory. Signal BTHRLAT may also be used to instruct the microprocessor to restart disk transfers to the buffer memory.

When block counter BLOCKCNT (FIG. 4B) reaches the maximum value or the maximum value minus one, comparators U221 and U220 (FIG. 4A), respectively generate a high output signal. A more detailed schematic of diagram comparators U221 and U220 is given in FIG. 13. The high output signal from comparator U200 is clocked through D-type flip-flop U219 to line BUFNRDY. Upon receipt of the high signal on line BUFNRDY, the disk sequencer in the disk control circuit terminates the data transfer between the buffer memory and the disk.

In this embodiment, in a read from the disk to the host, microprocessor 210 (FIG. 2) again initializes various bits in register BCTRCTL (Table 1). Specifically, bit DBCAREN is reset because disk byte counter 252 is not utilized. Similarly, disk byte counter clear bit DBCCLR is not set. Host byte counter clear bit HBCCLR is set. The high signal on line HBCCLR is applied to terminal BCCLR of host byte counter HBCNT (FIG. 3B) to clear host byte counter 254, as described above and incorporated herein by reference.

Microprocessor 210 in the read initialization also sets bits BCTRLOAD and BCTRVAL. In a read operation, block counter 256 is loaded with a zero value. Thus, in the read operation initialization, microprocessor 210 sets bit BCTRLOAD to one and bits BCTRVAL to "0,0", which in turn drives signal BCTRCLR to terminal BCTRCLR of block counter BLOCKCNT (FIG. 4B) high. In the initialization, the signals on lines BCTCOUNTI, BCTDECI, and BCTRLDMAX to input terminals BCTCOUNTI, BCTDECI, and BCTRLDMAX, respectively, of block counter BLOCKCNT are all low.

Signals BCTDECI and BCTRLDMAX (FIGS. 4A and 9A) drive NOR gate U104 (FIG. 9A). The resulting high output signal of NOR gate U104 drives the output signal of inverter U105 low so that a low signal is applied to terminal S0 of sixteen bit 4:1 multiplexer U100. The low signal on line BCTCOUNTI is buffered by inverters U106 so that a low signal is applied to terminal S1 of sixteen bit 4:1 multiplexer U100.

When the signal on terminal S0 is low and the signal on terminal S1 is low, sixteen bit 4:1 multiplexer U100 selects the signals on input terminals D0_(15:0) which is driven bus DIX(15:0) which in turn is connected to two by sixteen NOR gate U103. The high signal on line BCTRCLR, which is derived from bits BCTRVAL, is inverted by NOR gate U102 and then inverted again by inverter U110 so that a high signal is applied to two by sixteen NOR gate U103. Consequently, a logic zero value is applied to all sixteen terminals of input terminal D0_(15:0). Thus, the setting of bits BCTRLOAD and BCTRVAL by microprocessor 210 (FIG. 2) in the read initialization process loads block counter BLOCKCNT (FIG. 4B) with a zero value.

To enable decrementing block counter BLOCKCNT, microprocessor 210 (FIG. 2) sets bit BCTRHOSTEN in block counter control register BCTRCTL (Table 1). When bit BCTRHOSTEN is set, block counter BLOCKCNT (FIG. 4B) is decremented every time a whole block is transferred between the host and the buffer memory.

To enable incrementing block counter BLOCKCNT (FIG. 4B), microprocessor 210 (FIG. 2) sets a bit BCTRDISKEN in block counter control register BCTRCTL (Table 1). When bit BCTRDISKEN is set, block counter BLOCKCNT (FIG. 4B) is incremented every time a whole block is transferred between disk and the buffer memory.

Microprocessor 210 also loads register BCMAX with the number of bytes per block minus one byte. The value register BCMAX is provided by bus BCMAX(11:0) to host byte counter HBCNT (FIG. 3B and 5A).

As explained above, in a read operation, when a block of data has been read from disk and written to buffer memory 220 without an error or a block with an error was automatically corrected in buffer memory 220, disk control circuit 230 generates a pulse on line SECTOR_OK. The pulse on line SECTOR_OK (FIG. 3A) clocks D-type flip-flop U100, which has a logic one value on input terminal D. Two subsequent clock pulses on line CLK clock the resulting high output signal of flip-flop U100 through D-type flip-flops U101 and U102. The resulting high output signal from flip-flop U102 is applied to an input terminal of NAND gate U104 and to an input terminal of NOR gate U103.

The high input signal to NOR gate U103 drives the output signal low. The low output signal is applied to terminal NR of flip-flops U100 and U101 so that these flip-flops are reset. Thus, flip-flops U100, U101, and U102 in conjunction with NOR gate U103 generate a one clock cycle synchronized pulse SECTOROKP from asynchronous input pulse SECTOR_OK.

In addition to the high signal on line SECTOROKP from flip-flop U102 to NAND gate U104, NAND gate U104 receives a high signal from line BCTRDISKEN and so the output signal NAND gate U104 goes low. This low signal is applied to input terminal D0 of multiplexer U106. Since the signal on line DBCAREN is low, the low signal on terminal D0 is inverted and passed to NOR gate U127. The resulting low output signal from NOR gate U127 drives line BCTRUP-. The incrementing of block counter BLOCKCNT (FIG. 4B) when the signal on line BCTRUP— goes low was described above and that description is incorporated herein by reference. As each subsequent block is transferred from disk to buffer memory 220, a pulse on line SECTOR_OK increments block counter 256 in the same manner.

As explained above, transfers between the disk and buffer memory 220 and the buffer memory and SCSI bus 275 take place concurrently. Thus, buffer control circuit 240, in response to signals from microprocessor 210, may start to transfer data that has been loaded in buffer memory 220 to the SCSI bus. As each byte is transferred from buffer memory 220 to the SCSI bus, a pulse is generated on line BACK (FIG. 3B). Also, as explained above, in a read operation from disk (FIG. 2) to SCSI bus 275, integrated disk controller 200 is in the Read Mode, which means that the signal on line TARGWR (FIG. 3B) is low and the signal on line TARGWR— is high.

Since the signal on line BCTRHOSTEN was initialized high, as explained above, all the input signals to NAND gate U123 (FIG. 3B) are high when the signal on line BACK goes from low to high and so the output signal of NAND gate U123 goes from high to low which in turn drives the second input signal to NAND gate U124 low. Input signal TARGWR to NAND gate U122 is low so that the high output signal of NAND gate U122 drives the first input signal to NAND gate U124 high. Consequently, the signal on line HBCCOUNT from NAND gate U124 to input terminal BCCOUNT of host byte counter HBCNT goes from low to high with each pulse on line BACK.

The high signal on terminal BCCOUNT causes host byte counter value HBC to rollover from a zero value to the value of the number of bytes in a block minus one byte, as described above and incorporated herein by reference. Thus, the first pulse to host byte counter HBCNT on line BACK causes host byte counter value HBC to roll over from the initial zero value to a value equal to the number of bytes in a block minus one byte.

As each subsequent byte is loaded from buffer memory 220 into SCSI FIFO 271, the pulse on line BACK drives the signal on line HBCCOUNT high which in turn drives terminal BCCOUNT of host byte counter HBCNT high. The high signal on terminal BCCOUNT is applied to terminal S0 of twelve bit 4:1 multiplexer U104 (FIG. 5A) and so the decremented value on terminal D1_(11:0) is loaded into twelve bit D-type flip-flop U105 (FIG. 5B). Thus, host byte counter value HBC is decremented as each byte of data is transferred from the buffer memory to the SCSI FIFO.

When host byte counter HBCNT (FIG. 3B) has a value of one, the signal on line BCEQ1 from decrement circuit DEC12 (FIG. 5B) goes high which in turn drives the signal on line HBCEQ1 (FIG. 3B.) high. As described above, high signal HBCEQ1 is a first input signal to NAND gate U116. However, since signal TARGWR is low, flip-flop U116 is held in the reset mode and so can not be used to generate the high signal on line BCTRDOWN.

High signal HBCEQ1 is also applied to a first input terminal of NAND gate U126 (FIG. 3B). As explained above, the output signal of NAND gate U123, which drives inverter U125 goes low when signal BACK is high. Hence, the output signal from inverter U125 to a second input terminal of NAND gate U126 is high. Thus, the output signal of NAND gate U126 goes low when the signal on line HBCEQ1 goes high and the signal on line BACK is high.

The low output signal of NAND gate U126 drives the output signal of NAND gate U121 high so that the signal on line BCTRDOWN from NAND gate U121 goes from low to high which decrements block counter BLOCKCNT as described above, and incorporated herein by reference.

Thus, when host byte counter HBCNT reaches a value of zero, a block of data has been transferred from buffer memory 220 and block counter BLOCKCNT was decremented to indicate that one block more of memory is available in buffer memory 250. Hence, in the read operation, signal SECTOR_OK and host byte counter HBCNT (FIG. 3B) increment and decrement respectively, block counter BLOCKCNT (FIG. 4B). Consequently, microprocessor 210 is not required to maintain and monitor pointers for buffer memory 220 as in the prior art systems.

The read of data from disk continues until block counter BLOCKCNT reaches either a zero value or the maximum value. If block counter BLOCKCNT (FIG. 4B) reaches a value of one, signal HNRMLAT and signal HNOROOM go high as block counter BLOCKCNT decrements to a zero value, as described above and incorporated herein by reference. However, signal SREQSTOP is not generated because the signal on line TARGWR is low. When either signal HNRMLAT or signal HNOROOM goes high, transfer of data from buffer memory 220 to SCSI FIFO 271 is stopped. Host interface circuit 270 stops data transfer to the SCSI bus when SCCI FIFO 271 is empty. Thus, in this embodiment, signals HNOROOM and HNRMLAT prevent a buffer memory underrun.

When block counter BLOCKCNT reaches the maximum value or the maximum value minus one, comparator U221 or U220, respectively generate a high output signal. Note that signal DNOROOM is generated at the maximum value minus one because in this embodiment, the disk sequencer transferring the data to buffer memory may transfer one additional block after receiving no room signal DNOROOM. This assures that a data overrun does not occur.

The high output signal from comparator U200 is clocked through D-type flip-flop U219 to line BUFNRDY. Upon receipt of the high signal on line BUFNRDY, the disk sequencer in disk control circuit 230 terminates the data transfer to the buffer memory. When block counter BLOCKCNT reaches either the maximum value or the maximum value minus one, two actions are possible. If the signal on line ENDNRMLAT is high because microprocessor 210 in the initialization process set enable disk no room latched bit, the disk sequencer processing from disk to the buffer memory is terminated when block counter BLOCKNT reaches the maximum value and microprocessor 210 must reset the disk no room latched bit to reinitiate transfers between disk and the buffer memory.

Alternatively, if the disk sequencer has an idle loop and the disk no room latched bit is not set because signal ENDRMLAT is low, signal DNOROOM and signal BUFNRDY remain high until data are transferred between buffer memory and the host so that block counter BLOCKCNT is decremented. When the block counter BLOCKCNT is no longer at the maximum value or the maximum value minus one, signals DNOROOM and BFNRDY signals go low and so the disk sequencer may again transfer data between the disk and the buffer memory. Also, as described above, the threshold value may be used to determine when disk transfers are reinitiated.

In the embodiment, described above, a disk byte counter, a host byte counter, and a block counter were used to automatically control data transfer to and from a buffer memory and to terminate data transfer to prevent buffer overruns and underruns. This embodiment is only illustrative of the principles of this invention and is not intended to limit the invention to the specific embodiment described. In particular, in view of this disclosure, a single counter and the block counter could be used to implement the principles of this invention. More generally, a block counter, a means for incrementing the block counter, and a means for decrementing the block counter, according to the principles of this invention, may be implemented in numerous ways. Also, as will be appreciated by those skilled in the art, the incrementing and decrementing is an arbitrary selection of direction for the counters and is not intended to limit the invention to the particular direction described. The important aspect is that the available room and the data in the buffer memory are monitored and buffer overruns and underruns prevented without microprocessor intervention. Similarly, although a SCSI bus and signal sequences associated with a SCSI bus were described above, the principles of this invention are also applicable to an ISA, an EISA, or a microchannel bus, for example. In view of this disclosure, those skilled in the art will be able to implement the automated buffer control room logic in a wide variety of applications.

I claim:

1. An integrated disk drive controller comprising:
   a disk control circuit having an internal data bus and a sector-ok line;
   a host interface circuit having:
      a first-in-first-out memory circuit hereinafter referred to as said FIFO;
      an internal data bus coupled to said FIFO;
   a buffer control circuit connected to said disk controller internal data bus, to said sector-ok line, and to said host interface circuit internal data bus wherein said buffer control circuit further comprises a buffer room logic circuit comprising:
      a plurality of control registers;
      a disk counter connected to at least one register in said plurality of control registers, and having a disk counter output line;
         wherein said disk counter generates a signal on said disk counter output line upon said disk counter counting transfer of a block of data from a buffer memory to said disk control circuit;
      a host counter connected to at least one register in said plurality of control registers, and having a host counter output line;
         wherein said host counter generates a signal on said host counter output line upon said host counter counting transfer of a block of data over said host interface circuit internal data bus; and
      a block counter connected to at least one register in said plurality of registers, and coupled to said disk counter output line, to said host counter output line, and to said sector-ok line, and said block counter having a minimum value and a maximum value;
         wherein in a read operation, (i) a signal is generated on said sector-ok line by said disk control circuit upon a block of data being transferred to said buffer memory, and said block counter counts in a first direction in response to said signal on said sector-ok line; and (ii) in response to a signal on said host counter output line, said block counter counts in a second direction that is opposite to said first direction; and
         in a write operation, (i) in response to a signal on said host counter output line, said block counter counts in said second direction; and (ii) in response to a signal on said disk counter output line, said block counter counts in said first direction.

2. The integrated disk drive controller of claim 1 wherein said disk counter further comprises a programmable disk counter.

3. The integrated disk drive controller of claim 2 further comprising:
   a maximum count register having an output bus connected to a set of input terminals of said programmable disk counter.

4. The integrated disk drive controller of claim 3 wherein upon initialization of said integrated disk controller, a number of bytes in a block minus one byte is loaded in said maximum count register.

5. The integrated disk drive controller of claim 3 wherein said programmable disk counter further comprises a multiplexer having a set of input terminals connected to said maximum count register output bus wherein said set of input terminals of said programmable disk counter are said set of multiplexer input terminals.

6. The integrated disk drive controller of claim 1 wherein said host counter further comprises a programmable host counter.

7. The integrated disk drive controller of claim 6 further comprising:
   a maximum count register having an output bus connected to a set of input terminals of said programmable host counter.

8. The integrated disk drive controller of claim 7 wherein upon initialization of said integrated disk controller, a number of bytes in a block minus one byte is loaded in said maximum count register.

9. The integrated disk drive controller of claim 7 wherein said programmable host counter further comprises a multiplexer having a set of input terminals connected to said maximum count register output bus wherein said set of input terminals of said programmable host counter are said set of multiplexer input terminals.

10. The integrated disk drive controller of claim 1 wherein said block counter further comprises a programmable block counter.

11. The integrated disk drive controller of claim 10 further comprising:
a maximum block count register having an output bus connected to a set of input terminals of said programmable block counter.

12. The integrated disk drive controller of claim 11 wherein upon initialization of said programmable block counter a number of blocks in said memory minus one block is loaded in said maximum block count register.

13. The integrated disk drive controller of claim 12 wherein said programmable block counter further comprises a multiplexer having a set of input terminals connected to said maximum block count register output bus wherein said set of input terminals of said programmable block counter are said set of multiplexer input terminals.

14. The integrated disk drive controller of claim 13 wherein said multiplexer further comprises a second set of input terminals connected to a reference voltage.

15. The integrated drive disk controller of claim 1 wherein in said write operation, said maximum value is selected to prevent a buffer memory underrun and said minimum value is selected to prevent a buffer memory overrun, and further wherein upon said block counter reaching said maximum value, a first output signal is generated to stop data transfer from said buffer memory, and upon said block counter reaching said minimum value, a second output signal is generated to stop data transfer to said buffer memory.

16. The integrated drive disk controller of claim 1 wherein in said read operation, said minimum value is selected to prevent a buffer memory underrun and said maximum value is selected to prevent a buffer memory overrun, and further wherein upon said block counter reaching said maximum value, a first output signal is generated to stop data transfer to said buffer memory, and upon said block counter reaching said minimum value, a second output signal is generated to stop data transfer from said buffer memory.

17. The integrated drive disk controller of claim 1 wherein said first direction in which said block counter counts is towards said maximum value.

* * * * *